May 22, 1973  J. W. ESTES ET AL  3,734,719
OXY-FUEL PROCESS FOR MELTING ALUMINIUM
Filed Nov. 13, 1968  9 Sheets-Sheet 1
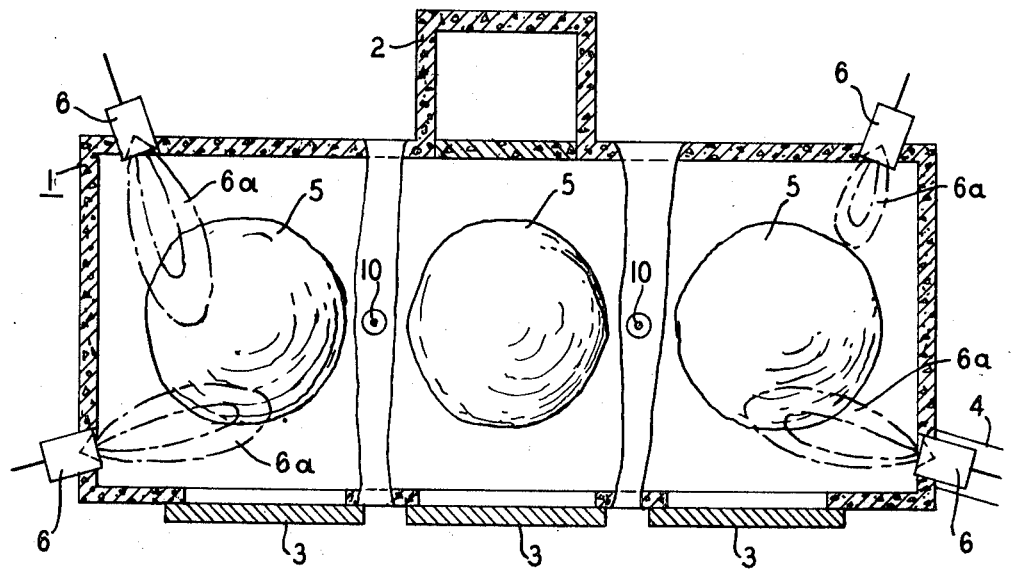
FIG. IA
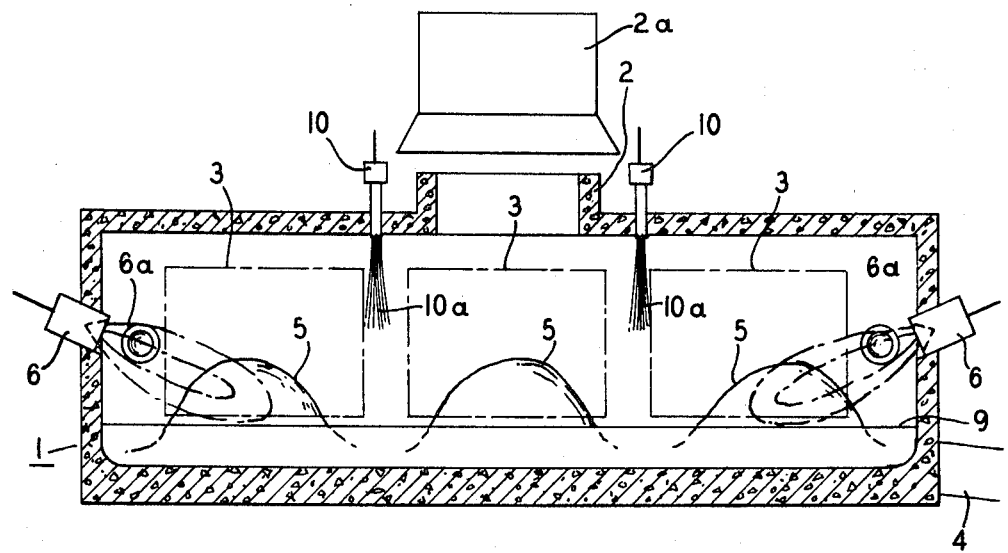
FIG. IB
INVENTORS
JAMES W. ESTES
LEWIS J. GEIGER, JR
THOMAS L. SHEPHERD
BY  F B Henry
ATTORNEY

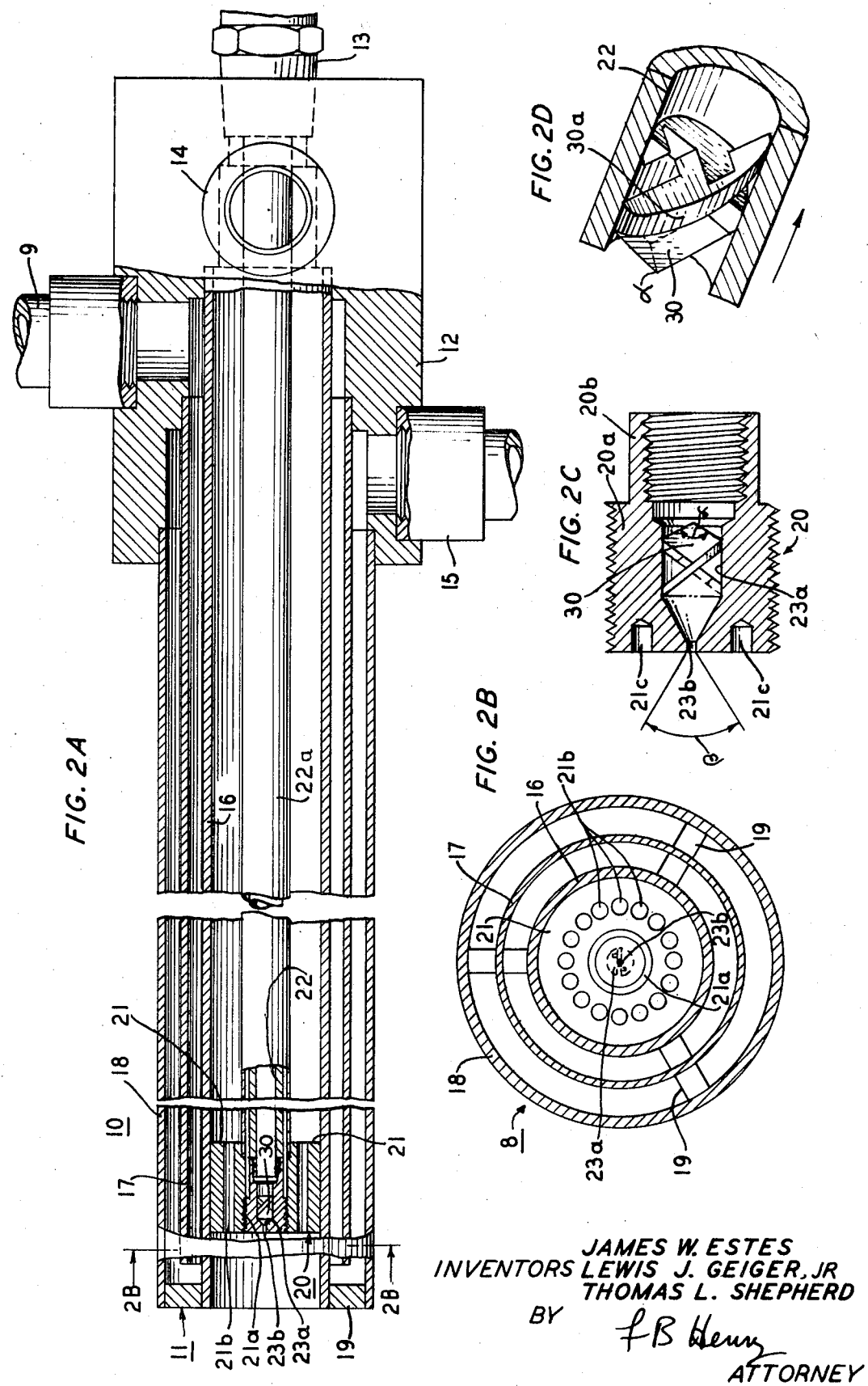

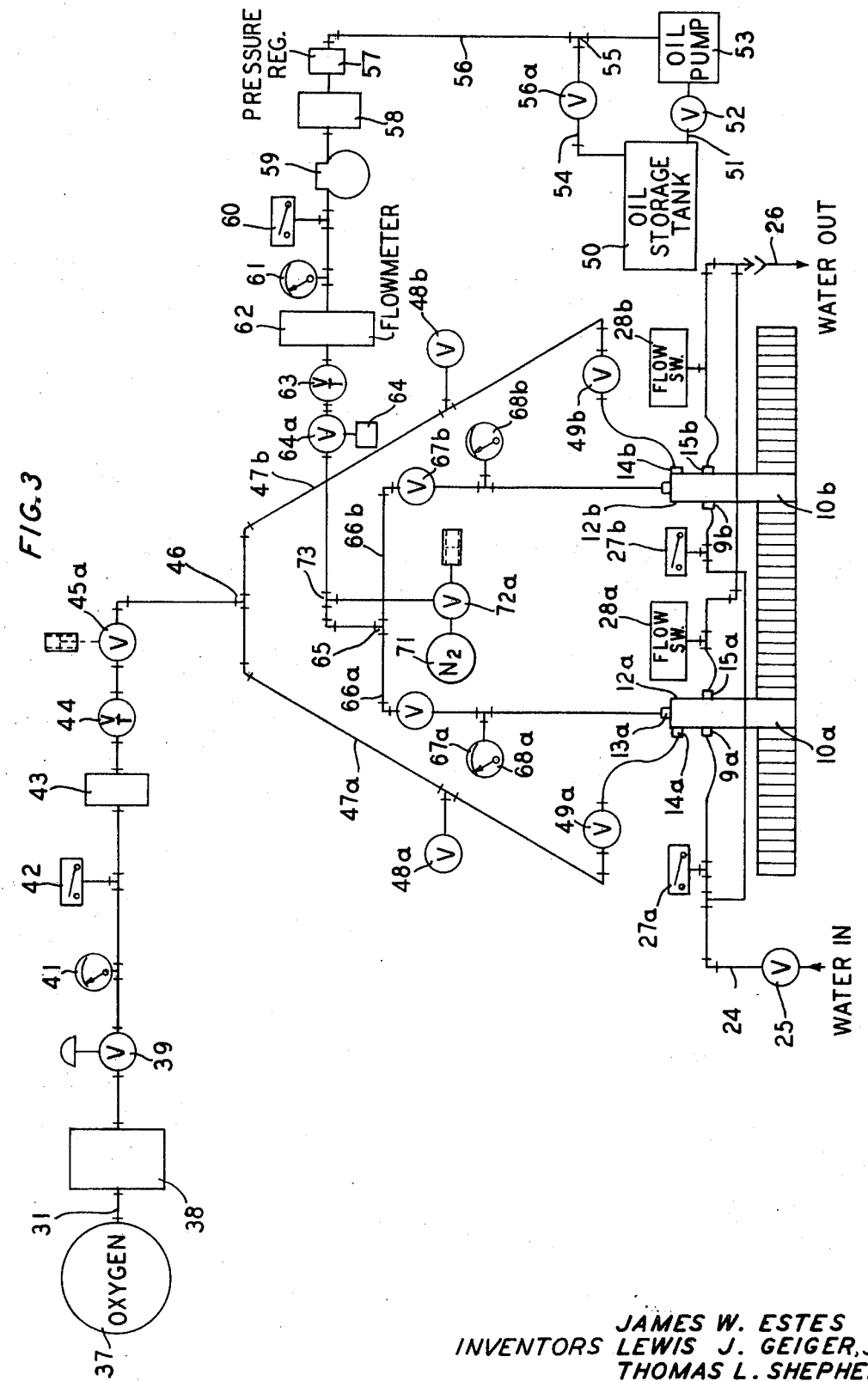

May 22, 1973  J. W. ESTES ET AL  3,734,719

OXY-FUEL PROCESS FOR MELTING ALUMINIUM

Filed Nov. 15, 1968  9 Sheets-Sheet 5

INVENTORS
JAMES W. ESTES
LEWIS J. GEIGER, JR
THOMAS L. SHEPHERD

BY F B Henry

ATTORNEY

May 22, 1973     J. W. ESTES ET AL     3,734,719

OXY-FUEL PROCESS FOR MELTING ALUMINIUM

Filed Nov. 13, 1968

JAMES W. ESTES
LEWIS J. GEIGER, JR
THOMAS L. SHEPHERD
INVENTORS

BY   *L B Henry*

ATTORNEY

May 22, 1973

J. W. ESTES ET AL 3,734,719

OXY-FUEL PROCESS FOR MELTING ALUMINIUM

Filed Nov. 13, 1968

INVENTORS
JAMES W. ESTES
LEWIS J. GEIGER, JR
THOMAS L. SHEPHERD

BY  F B Henry

ATTORNEY

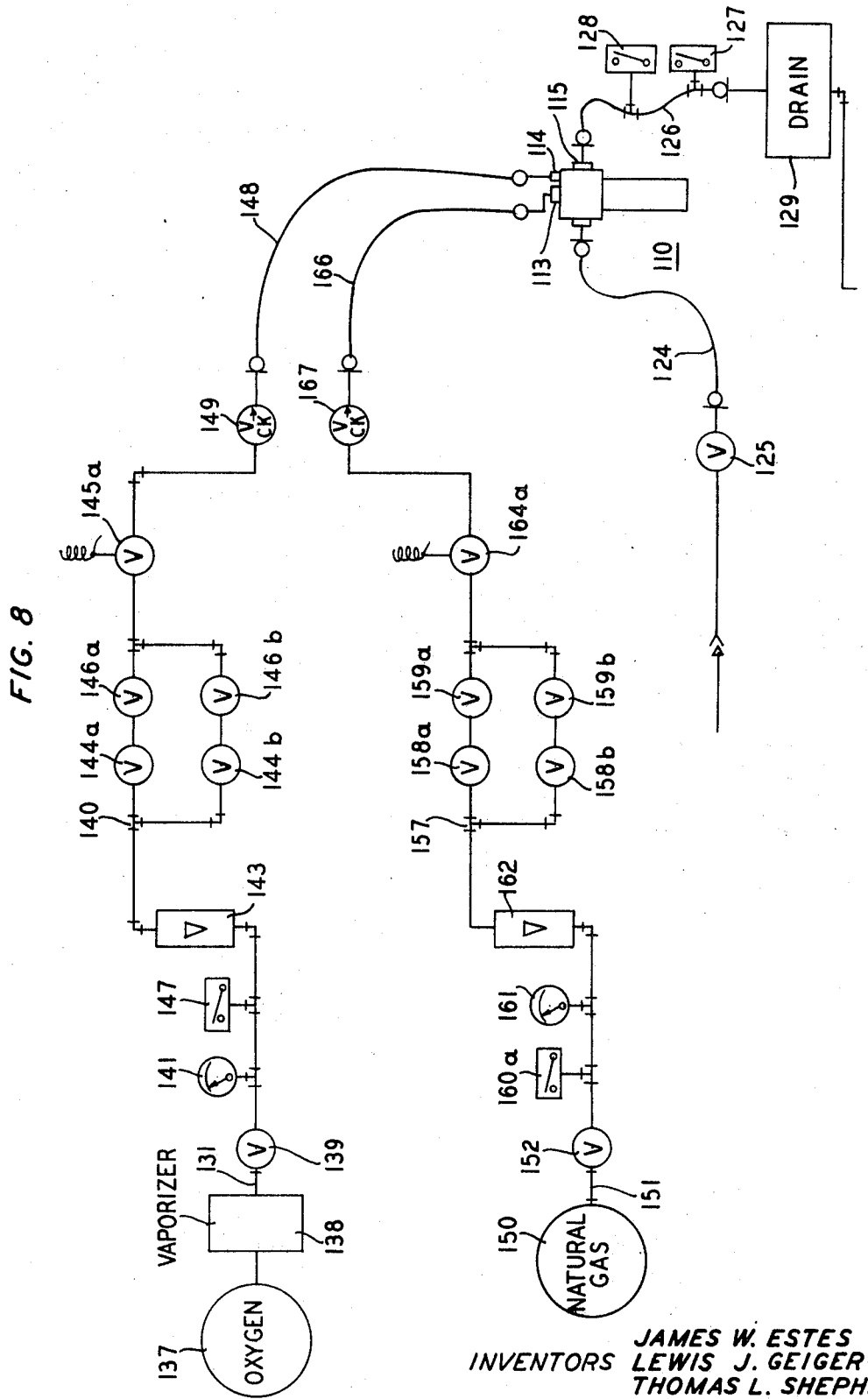

United States Patent Office 3,734,719
Patented May 22, 1973

3,734,719
OXY-FUEL PROCESS FOR MELTING ALUMINUM
James W. Estes, Piscataway, Lewis J. Geiger, Jr., Edison, and Thomas L. Shepherd, Essex Fells, N.J., assignors to Airco, Inc.
Filed Nov. 13, 1968, Ser. No. 775,367
Int. Cl. C22b 7/00, 21/06, 21/00
U.S. Cl. 75—65
14 Claims

ABSTRACT OF THE DISCLOSURE

Process for melting metals in a fuel-fired furnace, more specifically, for the remelting of secondary aluminum. The process, which may be applied in a furnace of the reverberatory type, employs one or more oxy-fuel burners to supplement the heating operation of conventional air-fuel burners. The oxy-fuel burner flame is carefully controlled as to length, direction, velocity, temperature, and flame chemistry so that at least 90 percent of the combustion is completed before the combustion products come in contact with the charge or the bath. Several alternative furnace burner arrangements are disclosed which respectively employ oxy-oil burners of the self-atomizing tip-mix type, and oxy-gas burners of the rocket type. In each case, the oxy-fuel burners are disposed to create turbulence which substantially enhances the heat transfer in the furnace, thereby vastly increasing the melting rate.

BACKGROUND OF THE INVENTION

This invention relates in general to the furnace processing of metals, and more particularly to the melting of secondary aluminum in furnaces of the reverberatory type.

The reverberatory furnace, which is adapted to melting large volumes of metal for use in foundry holding furnaces, permanent-mold dip wells, foundry and fabricating ingot production, and scrap remelting, is a preferred device for melting secondary aluminum. Conventional reverberatory furnaces, depending on the size, may be equipped with air-fuel burners, either of a flat burner type installed in the furnace roof, or of types that produce a long, luminous flame, which are installed either in the sidewall or end wall, opposite the charging door. As the name implies, the metal charge of the reverberatory furnace receives heat by transfer from the hot inside refractory surfaces, as well as by direct heating with the fuel flame.

The size and number of burners are usually selected on the basis of the melt rate desired, a fuel efficiency of 30 percent of input being considered good in melting aluminum. Adequate furnace volume is provided above the charge to allow complete burning of the fuel with proper circulation of the combustion products to minimize the formation of dead spots or hot spots. This combustion space, which is often as large as 10 times the volume of the charge, will allow input of only so much fuel with air. Exceeding the normall capacity of the furnace causes a rise in flue-gas temperature, resulting in poor efficiency and overheating of refractories in flue areas or other "hot spots," which result from fuel being burned on the hot surfaces of brickwork. It has been found further that increasing the fuel firing rate of conventional burners under these conditions will usually not increase the charge melting rate, inasmuch as the release of heat energy to the charge will not be improved.

Accordingly, a principal object of the present invention is to provide a system for melting metal, more particularly aluminum, in a fuel-fired furnace characterized by greater efficiency of heat transfer to the charge. More particular objects of the invention are to provide a system for melting aluminum in which there is a substantial reduction in meltdown times for the charge together with savings in fuel consumption, and reduction in dross formation and losses from aluminum vaporization. Another object of the invention is to reduce refractory damage in the furnace. A further object is to provide an improved metal product by decreasing dissolved gaseous inclusions.

BRIEF DESCRIPTION OF THE INVENTION

These and other objects are realized in accordance with the present invention in a process and apparatus for melting metals, more specifically secondary aluminum, in a reverberatory furnace, in which one or more auxiliary oxy-fuel burners are used to supplement the operation of air-fuel burners, in a manner whereby the oxy-fuel flame is carefully controlled so that at least 90 percent of the combustion is completed before the combustion products come in contact with the charge or the melt. This is carried out by providing an oxy-fuel flame of a turbulent type, having a flame velocity within the range 500 to 3,500 feet per second, a temperature within the range 3,500° to 5,000° Fahrenheit, in which the oxygen-fuel ratio has been adjusted to provide at least about 65 percent and preferably, 75 percent, of the stoichiometric requirement for complete combustion. The flame, which is 4 to 7 feet long, emanates from a burner mounted flush with the roof or side walls of the furnace. The oxy-fuel flame is so directed that instead of directly contacting the charge or the melt, it comes in contact with the combustion products of the relatively lower temperature air-fuel burners, thereby creating a high degree of turbulence which stimulates the operation of convection currents in the furnace which serve to enhance the transfer of heat energy to the charge.

The invention is described relative to several specific embodiments.

The first of these is a conventional rectangular aluminum remelt reverberatory furnace having three symmetrically spaced charging doors in the front wall and a flue adjacent to the back wall. This furnace is equipped with four conventional air-fuel burners, two burners directed toward the charge from positions near the front end of opposite sidewalls, and two additional burners directed into the furnace from opposite ends of the back wall. Two 1½ inch (approx.) oxy-fuel burners mounted in the roof at symmetrically spaced positions are directed between the islands of charge. The burner nozzles are flush with the inner refractory lining of the roof. In the illustrative embodiment described, the burners for this application are oxy-oil burners of a self-atomizing tip mixer type, equipped with swirlers which operate to impose an angular twist on the emergent stream of oil, which is surrounded by an annular ring of oxygen jets. A highly turbulent, non-coherent flame is produced which is directed to intermingle with hot combustion products emerging along the intersecting axes of the air-fuel burners.

Tests with a series of scrap charges in an 85,000 pound capacity furnace of the aforesaid type indicated an increase of nearly 100 percent in the melting rate, and about a 25 percent reduction in melt loss from dross and other causes.

The second embodiment comprises a small rectangular aluminum reverberatory furnace of the side hearth type. The scrap used to charge this furnace is disposed in a well adjacent to one end of the furnace, which is fired by two small conventional air-fuel burners mounted in the back wall on opposite sides of the flue, and directed toward the front. Molten metal is pumped from the furnace into the charging well and back through the main body of the furnace to form a flat bath. An auxiliary 1½ inch diameter barrel water cooled oxy-gas burner of the rocket type is mounted on the rear portion of the furnace through a clean-out door, with the burner nozzle flush with the inner lining of the furnace, and the flame directed obliquely inward, the flame length being carefully controlled so that combustion is substantially completed before the products come in contact with the bath. Moreover, the axis of the oxy-fuel flame is directed transversely to the axes of the low pressure air-fuel flames, so as to maximize the turbulence of the combustion products in the furnace, thereby to increase the heat transfer by convection.

Employing a 45,000 pound capacity furnace of the type indicated, tests showed an increase of up to 100 percent in the production rate, and a 50 percent decrease in the fuel consumption.

A third embodiment described comprises an aluminum melting furnace of a reverberatory type of rectangular cross-section, equipped with a pair of symmetrically spaced charging doors mounted on the front, and a flue at the rear wall. This is heated by two pairs of conventional air-fuel burners. One pair is inwardly directed from opposite end walls of the furnace, near the front corners. The burners of the second pair are respectively mounted at opposite ends of the back wall, near the corners. A 3 inch water cooled oxy-gas rocket burner is interposed near the top of one sidewall and is directed downwardly at an angle of about 20 degrees with the horizontal, in a position along the long central axis of the furnace. The burner nozzle is flush with the inner wall of the furnace; and, the flame length is so controlled that combustion is about 90 percent complete before the combustion products contact the piles of scrap in the process of melting.

Tests conducted in a 55,000 pound capacity reverberatory furnace, of the last type indicated, showed an increase of up to 53 percent in the melting rate of the furnace over conventional operations, with an equivalent decrease in fuel consumption.

It will be apparent to those skilled in the art that the described process for application of oxy-fuel burners as a supplement to conventional air-fuel burners in reverberatory type furnaces marks a substantial step forward in the art of melting down scrap, particularly secondary aluminum.

Among the many advantages to be realized in the use of the process of the present invention are the following:

(1) The melting rate of the processed aluminum was increased up to 50 percent or more, because of more efficient heat transfer.

(2) The amount of dross and other losses was substantially reduced.

(3) Fuel cost per ton of product was substantially reduced, indicating more efficient heat utilization.

(4) Product quality was improved because of more uniform heating, and more precise control of flame chemistry.

These and other objects, features, and advantages of the present invention will be better understood by a study of the detailed specification hereinafter with reference to the appended drawings.

SHORT DESCRIPTION OF THE DRAWINGS

FIGS. 1A and 1B show in plan view and front elevation respectively, an aluminum reverberatory furnace including oxy-fuel burners interposed through the roof, in accordance with the present invention;

FIGS. 2A and 2B show in longitudinal section and in cross-section respectively, a self-atomizing tip-mix burner of a type employed in the structure shown in FIGS. 1A and 1B;

FIG. 2C is an insert showing swirler interposed into tip portion of the burner of FIGS. 2A and 2B;

FIG. 2D is an enlarged showing of the swirler in perspective, with the burner nozzle partly cut away;

FIG. 3 shows a typical oxy-fuel supply system for the tip-mix burner systems of FIGS. 2A and 2B;

FIG. 8 shows a typical oxy-gas supply system for the rocket burners of FIGS. 7A and 7B.

Figure 4:
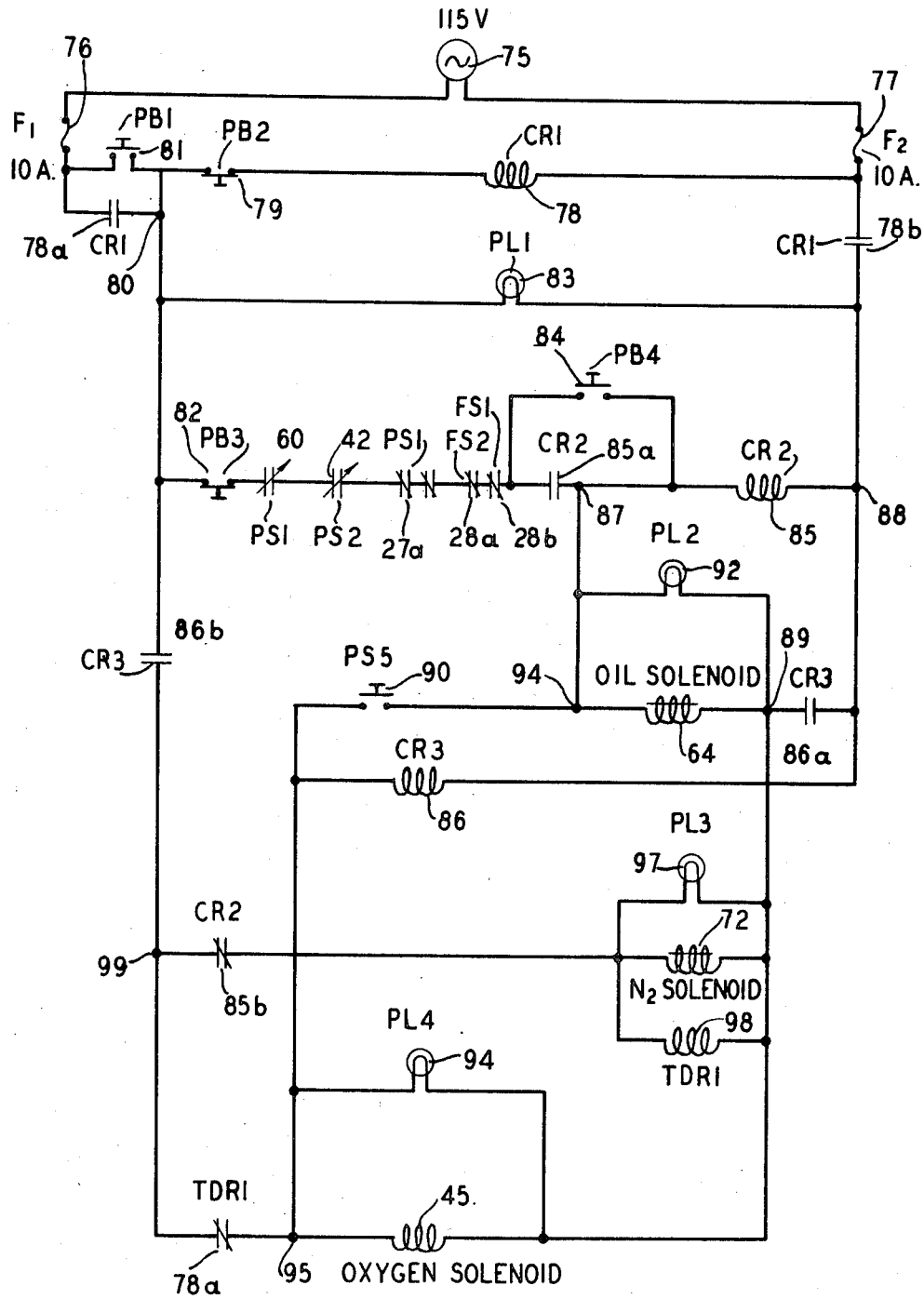
FIG. 4 shows a typical electrical circuit schematic for the burner system of FIGS. 2A and 2B.

Referring to FIGS. 1A and 1B of the drawings, there is shown an 80,000 pound furnace 1 of a reverberatory type for remelting secondary aluminum, which is rectangular in shape, having internal dimensions of 30 feet 5 inches long, 11 feet 7 inches wide, and 6 feet 9 inches high. A flue 2 located adjacent to the back wall, has an inner dimension 5⅓ feet by 4 feet, and rises about 1⅓ feet above the roof of the furnace where it is topped by a hood 2a. The sidewalls of furnace 1, which are constructed of steel-shell plates lined with refractory bricks comprising, for example, alumina, are 13 inches thick; and the refractory brick hearth portion, which may be slightly inclined toward the tap 4 at one end, is 16 inches thick in the present illustration. The general construction and operation is similar to that described in the section entitled Reverberatory Furnaces, pp. 6 and 7, Aluminum, vol. III, Fabrication and Finishing, edited by Kent R. Van Horn and published by American Society for Metals, Metals Park, Ohio, 1967.

The furnace 1 is equipped with three doors 3, each dimensioned about 6 feet 4 inches long by 5 feet 4 inches high, and 8 inches thick, symmetrically spaced across the front of the furnace and based at a level about 2 feet above the hearth.

The furnace is conventionally fired by means of four air-fuel burners 6. In the present illustration, these may be of the general type manufactured by the North American Manufacturing Company, of Cleveland, Ohio (Bulletin #113, 5/66).

The burners 6 are adapted to burn a mixture of No. 6 fuel oil and air, derived from a conventional supply system not shown, and are each capable of firing at a maximum rate of 11,200,000 British thermal units per hour. One pair of the conventional burners 6 is mounted in the back wall of the furnace, each having its central axis at a distance about 2 feet from a respective corner, and located about 4 feet 8 inches above the hearth, in each case. Each of these burners is directed inwardly at an angle of about 15 degrees from the surface of the side wall. Each burner of the other conventional pair 6 is located in one of the end walls of the furnace, having its central axis in a position about 1 foot from the inner front corner, and about 4 feet 8 inches above the hearth. The burners of this pair are directed inwardly at angles of about 12 degrees from the surface of the front wall, and downwardly at an angle of about 8 degrees to the horizontal plane. Each of the nozzles of the burners 6 is fixed substantially flush with the inner wall of the furnace, so that only the flames extend into the furnace. Each of the conventional burners 6 is supplied with air at the rate of 115,000 cubic feet per hour, and No. 6 "Bunker C" oil at the rate of 73.5 gallons per hour, to produce a flame having a velocity of approximately within the range 20 to 100 feet per second, and having an average maximum temperature within the range 2,700 to 3,200 degrees Fahrenheit. These low velocity low pressure air-fuel flames have a combustion zone having a central luminous portion extending about 8 feet outward from the burner tip.

In accordance with the present invention the heat supplied by the conventional furnace burner system, as typified by the low velocity burners 6, is supplemented by additional heat energy supplied by auxiliary high velocity oxy-fuel burners to the extent of 20 to 30 percent of the total. In the embodiment disclosed in FIGS. 1A and 1B these take the form of a pair of burners 10, which are interposed into the roof of the furnace along the central axis, on opposite sides of the flue, each at a position removed about 1 foot 4 inches therefrom.

The oxy-fuel burners 10, which employ oil as a fuel in the embodiment under description, are of a self-atomizing tip-mixer type, to be described in detail with reference to FIGS. 2A thru 2D, interposed into the nozzles of which are swirlers which serve to impart an angular velocity to the atomized stream of oil before leaving the burner tip. The axis of each of the burners 10 is perpendicular to the roof of the furnace; and, the end of each of the water jackets is flush with the inner lining of the furnace.

Referring to FIGS. 2A and 2B, the inner end of burner assembly 10, including the water jacket 11, is held in place by a conventional spider arrangement 19. The actual burner tip may be recessed so that its end is withdrawn about ¼ inch inside of the water jacket 11. However, the position of burner assembly 10, within the water jacket 11, is adjustable to any one of a number of different longitudinal positions, depending on the specific operation under description.

The outer end of burner assembly 10 terminates in burner body head 12, to which are connected the fuel feed line thru the connection 13, the oxygen feed line thru the connection 14, and the cooling water pipes thru connections 9 and 15, to the water pumping system (not shown). The feed lines are coupled to the oxy-fuel supply system which, together with the connecting conduits, will be described in detail with reference to FIG. 3 hereinafter.

Let us refer now, to FIGS. 2A and 2B which are detailed longitudinal and cross-sectional showings of the self-atomizing tip-mix burner, which is a preferred type when oil is the preferred fuel due to cost, etc., in a furnace for melting secondary aluminum of the type shown in FIG. 1. A burner of the type shown provides for the development of a stable, homogeneous, high velocity oxy-oil flame, combustion being initiated in, or taking place in, an established combustion zone immediately adjacent to the burner tip.

For cooling purposes, the burner assemblage includes an enclosing water jacket 11. This comprises an external pipe 18 which is a hard-drawn, seamless brass tube 0.095 inch in wall thickness, having an outer diameter of 2½ inches and 39⅜ inches long. Concentrically disposed inside of pipe 18, and terminating ½ inch from the inner end of the latter, is a second pipe 17 of seamless brass tubing 0.065 inch in wall thickness, 2 inches in outer diameter and 40⅜ inches long. A third pipe 16, constituting the burner barrel is located concentrically inside of pipes 17 and 18, the inner end of the latter being flush with the pipe 18. Pipe 16 which houses the burner proper is also of seamless brass tubing 0.065 inch in wall thickness, 42⅜ inches long, and 1½ inches in outer diameter. An annular brass plug 28, which is 2 5/16 inches in outer diameter, 1½ inches in inner diameter, and ¼ inch thick, is fitted into the inner end of the water jacket assemblage 11, and brazed with silver solder in the peripheral junctions. The three concentric pipes 16, 17, 18, constituting the water jacket 11 and the burner barrel which are held in position by conventional separators, are fitted at their external ends into the terminal fitting or burner breech assembly 12, which is a cylindrical brass element 5½ inches in axial length and 3½ inches in diameter, having four openings, each communicating with a different concentric channel. The water intake pipe 9, which is about 1 inch in outer diameter, is tapped into a cylindrical arm which protrudes laterally about ¾ inch from the burner breech assembly 12. The cylindrical arm is 1½ inches in outer diameter and 1 inch in inner diameter, and leads at its inner end to the annular chamber between the brass pipes 16 and 17 of the water jacket 11. An oppositely directed lateral arm on burner breech assembly 12, which is similarly dimensioned, screws onto the water outlet pipe 15b and taps into the annular space between pipes 17 and 18, so that a stream of water entering at 9 flows the length of the water jacket 11 through the outer annular passage, and returns through the inner annular passage to 15, where it flows out.

The burner proper, whose tip is designed to be moved to different positions within the inner sleeve 16, is recessed in the present illustration at a position about ¼ inch from the inside end of water jacket 11. Fitted inside of brass tube 16 is a cylindrical burner block element 21. This is a copper cylinder 1 inch long and 1⅜ inches in outer diameter. At its end, it has a screw threaded centered opening 21a, ¾ inch in diameter. The function of this opening is to accommodate the oil atomizer orifice member 20, shown in FIG. 2c, which will be described presently. Extending parallel to and surrounding the bore 21a are a plurality of smaller bores 21b which are 16 in number and ⅛ inch in diameter in the present embodiment and serve to transmit streams of oxygen. These are symmetrically disposed with their centers on a circle 1 1/16 inch in diameter and concentric with bore 21a.

The oil atomizer 20 (see FIG. 2C) is a double cylindrical member of solid brass having a larger diameter left-hand portion 20a which is screw-threaded to fit into the central opening 21a of burner block 21, and a smaller diameter right-hand portion 20b which is internally screw-threaded at its inner end to a depth of ⅜ inch to accommodate the screw-threaded end of oil conduit 22.

The axially disposed oil conduit 22, which is within an elongated cylindrical thin walled fluid tight tube 22a, is screw-threaded at both ends and is threaded into oil atomizer 20 at the inner end. Conduit 22 extends along the axis of the burner 8 and through block burner element 12, terminating at the outer end in a brass bushing 13a which is internally screw-threaded for coupling to the oil feed line 33.

The central opening 23a and 23b of orifice (nozzle) element 20 is axially disposed. The larger cylindrical portion 23a, about ¼ inch in inner diameter, communicates with the conduit 22, and extends axially to about ⅛ inch from the end toward the furnace, where it narrows through a funnel-shaped nozzle having a central opening 23b, about ¹⁄₃₂ inch in diameter in the present embodiment, and formed with an apex angle of about 60°.

A particular feature of the present invention is the use of a swirler 30 of the type shown in FIG. 2D of the drawings. This comprises a small element formed of brass about ⅛ inch thick. The inwardly directed end of element 30 is machined to an angle α about 120° in the horizontal plane, above and below which are formed a pair of semicircular vanes, each of which vanes has a principal surface in a plane parallel to a respective arm of the angle α. The swirler 30 is interposed so as to fit tightly into the passage 23a of the oil atomizer 20, so directed that the apex of the angle α is away from nozzle opening 23b. The oil pressure prevents the swirler from rotating. The oil stream is rotated by the stationary vanes of the swirler. A preferred form of swirler is one dimensioned to produce a cone of atomized oil at the burner nozzle having an apex angle β of at least 30°. This produces a bushy flame which was found to be optimum for the purposes of this invention.

A lateral inlet arm 14, which is 1¾ inches in outer diameter and 1 inch in inner diameter, leads out of the burner body assembly 12 and is coupled in a gas-tight seal with the oxygen hose, for introducing oxygen into the annular space between the stainless steel oil conduit 22 and the inner brass tube 16.

Referring to FIG. 3, there is shown, in schematic, an example of the configuration of the oxygen, fuel, and cooling water in accordance with the present invention. Inasmuch as there are two burners in the present system, the corresponding elements in the connections to the left and right hand burners have been designated "a" and "b" respectively.

In preferred arrangement, water for cooling the burner system is brought into the burner breech assemblies 12a and 12b through the intake valves 9a and 9b, at a pressure of 50 pounds per square inch absolute, flow rate of 10 to 15 gallons per minute, and ambient temperature, from any ordinary water tap through a flexible intake hose 24 under control of a conventional globe valve 25 into intake pipes 9a and 9b. The water passes through the concentric channels in the respective water jackets 11a and 11b of burners 10a and 10b, out through the outlet pipes 15a and 15b and flexible hose 26. Pressure switches 27a and 27b, and flow switches 28a and 28b respectively, are adjusted to shut off fuel, oxygen and water to the burners in the event of inadequate water supply or serious leaks in the burners.

Oxygen for the two burners 10a and 10b is derived from the liquid oxygen station 37. In the present illustration this may take the form of a stainless steel vessel of the type shown, for example, on page 11 of Catalog No. 450, issued November 1960, by Air Reduction Company, Incorporated, 150 East 42nd St., New York, N.Y. The liquid oxygen in station 37 is maintained at a temperature of —240° Fahrenheit, under a pressure of 165 pounds per square inch absolute.

Oxygen from the station 37 passes through a 1½ inch conduit 31 into vaporizer 38. The latter is a conventional electrically energized unit capable of converting liquid oxygen at a temperature of —240° Fahrenheit and pressure of 165 pounds per square inch asbolute, at the rate of 40,000 standard cubic feet per hour to vapor at 40° Fahrenheit at the same pressure. The newly generated vapor passes at a flow rate of approximately 15,000 standard cubic feet per hour through a conventional type pressure regulator 39, where its pressure is regulated to approximately 75 pounds per square inch absolute.

Pressure regulator 39 is connected at its output to a conventional pressure gauge 41. The conduit 31 then passes through a conventional pressure switch 42. This operates through an electrical circuit which will be presently described with reference to FIG. 4, to operate the proper alarm system and to close down the system when the oxygen pressure in the line falls below, say, 35 pounds per square inch, the optimum pressure for operation being 75 pounds per square inch absolute. The line next passes through a conventional flowmeter 43.

From flowmeter 43, the line 31 then passes through a conventional throttle valve 44, in which the pressure is reduced and the oxygen flow to the burners is controlled. Next, the oxygen flows through the 1½ inch normally closed solenoid-actuated valve 45a, which is remotely operated to cut off the flow of oxygen to the burners 10a and 10b in an emergency.

The oxygen then flows into junction 46, where the line is divided into two identical 1 inch pipes 47a and 47b. Each of these passes through a pressure gauge 48a and 48b and a valve 49a and 49b, from which the respective pipes are connected through 1 inch stainless steel hoses to the oxygen inlet terminals 14a and 14b of the burners 10a and 10b.

The oil for fueling the burners of FIGS. 2A and 2B is derived from the oil storage tank 50, through the ½ inch conduit 51, under control of the valve 52. A pump 53 is interposed in the conduit 51 for the purpose of imparting a pressure to the oil to enable it to flow through the circuit to the burner. The pump functions to increase the line pressure from 35 to 80 pounds per square inch gauge, thus enabling the flow of a maximum of 75 gallons per hour of oil in this circuit. A relief by-pass 54 returns to the oil storage tank 50 from the junction 55 under control of valve 56a. The ½ inch conduit 56 passes through the pressure regulator 57 which maintains the pressure within the conduit within the range 40 to 80 pounds per square inch gauge. From regulator 57 the oil stream passes through the conventional oil filter 58 and the oil totalizer 59. This may be a conventional positive displacement type. From totalizer 59, the conduit passes through the normally closed pressure-responsive contacts 60 which are in series with control relay 85, to be described with reference to FIG. 4 hereinafter. The oil stream next passes through the pressure indicator 61, and the conventional flowmeter 62 for respectively monitoring the pressure and flow, the latter being preferably maintained at about 70 gallons per hour. From the latter, the conduit 56 passes through a throttle valve 63. It then passes through a solenoid-operated valve 64a, control of which will be explained with reference to the circuit shown in FIG. 4. Conduit 56 passes through junction 73 and terminates in a junction 65, which divides into two identical ¼ inch pipes 66a and 66b. Each of these pipes passes through a valve 67a and 67b, an additional pressure indicator 68a and 68b, and through a conventional oil strainer. The conduits 66a and 66b are each then connected through a flexible ¼ inch pipe to the respective oil terminals 13a and 13b of the burners 10a and 10b, where the oil stream passes in each burner through the axial conduit 22 and into the atomizing nozzle 20 (see FIGS. 2A and 2B).

In addition to the oil transmission system, there is shown a connection to a source of nitrogen 71 for purging the oil system of tars and other impurities at intervals between operations. The nitrogen source 71 is connected through a solenoid-operated control valve 72a which is part of the electrical circuit shown in FIG. 4, to be described presently.

The line from the valve 72 passes into a junction 73. The latter is connected into conduit 56 in advance of the junction 65, so that when valve 72a is open and valve 64a to the oil source is closed, the nitrogen purging stream from source 71 flows into terminals 13a and 13b of the burners 10a and 10b to perform an oil-purging operation.

Referring now to FIG. 4, there is shown an electrical schematic for operating the oxy-oil, nitrogen, control circuit for the burners 10a and 10b. This comprises a power source 75 which may, for example, comprise a line connection, conventionally 115 volt, 60 cycle per second, alternating current. The source 75 is connected at each of its two terminals through a pair of 10-ampere fuses 76 and 77, across the circuit of the primary control relay 78. The circuit to the relay 78 includes the normally-closed circuit breaking push button contact 79, and the normally-open push button contact 81 for starting the system. The latter is bridged by the normally-open contacts 78b of relay 78, which closes as soon as the reloy is energized, locking it in operation. Normally-open contacts 78b of relay 78 connect the junction of one terminal of relay 78 and the power supply circuit 75 to pilot light 83, which is illuminated when relay 78 is operated, showing that the power to the oxy-fuel system has been turned on. In parallel across the pilot light 83 is a circuit which includes a second relay coil 85 in series with push button contacts 84 bridged across by normally open contacts 85a of the relay 85. The latter are in series with normally-open flow-sensitive contacts 28a and 28b, and pressure-sensitive contacts 27a, 27b, all to the water cooling system, pressure-sensitive contacts 42 to the oxygen supply system, and pressure-sensitive contacts 60 to the oil supply system, all in series with the normally-closed push button contacts 82. The aforementioned flow-sensitive and pressure-sensitive contacts, which are indicated in the pipe schematic of FIG. 3, plus circuit-breaking push button contacts 82, serve to cut off operation of the oxy-fuel system in response to either automatic or manual control in case of emergency.

Assuming all of the safety contacts are closed, upon depression of push button 84, relay 85 is lock-operated through closure of its normally-open contacts 85a. Normally closed contacts 85b of the nitrogen purge system are opened. Current then flows from the source of power 75 through the series circuit including push button 82, the aforementioned safety contacts, relay contact 85a, junction 87, and lock-operated relay 85 to junction 88, and back to the power source. When push button 90 is closed, relay 86 is energized, closing normally-open contacts 86a and 86b. This lock operates relay 86 through a path including junctions 80, 99, and 95, on its one terminal, and junction 80 on its other terminal.

Operation of relay 86 energizes oil solenoid 64 in parallel with pilot light 92, through a path from junction 87 to junction 88. Oil solenoid 64 then holds normally-closed valve 64a open as long as it is energized. Simultaneously, oxygen solenoid 45 is energized, in parallel with pilot light 94, through a path including junctions 80, 99, and 95 on one terminal, and 89 and 88 to the other terminal. Solenoid 45 holds normally-closed oxygen intake valve 45a open as long as it is energized. Thus, oil solenoid 64 and oxygen solenoid 45 are both energized, providing for the flow of oil and oxygen through the respective intake valves 64a and 45a. During this period, operation of relay 85 has opened normally-closed contacts 85b, so that nitrogen purge valve 72a which is actuated by solenoid 72, remains closed.

When control relay 85 is de-energized, by operation of circuit breaking push button 82, or by opening of one of the numerous pairs of safety contacts, the oil solenoid 64 is de-energized; but, relay 86 remains lock operated.

Normally-closed contacts 85b then close, completing the circuit to nitrogen solenoid 72, which releases nitrogen into the oil lines of the burners 10a, 10b through junction 73 (see FIG. 3).

In parallel with nitrogen solenoid 72 are pilot light 97, indicating operation of the nitrogen solenoid, and time delay relay 98. The latter opens the normally-closed contacts 98a to junction 99 after a delay of a few seconds, thereby disconnecting junction 95 from one power terminal, and de-energizing relay 86, terminating the nitrogen purge, and de-energizing oxygen solenoid 45.

Test operation of the furnace shown in FIGS. 1A, 1B was carried out as follows.

Charges 5, each weighing approximately 45,000 pounds, and varying from light foil to heavy ingots, were loaded into the furnace 1 through each of the water cooled doors 3 at the front of the furnace. The average charging time was 30 minutes in the present example. After the charge was melted, the furnace 1 was tapped into an adjoining holding furnace through a 4 foot stationary-runner 4. In the holding furnace (not shown), the aluminum was alloyed and fluxed, prior to transfer to a direct-chill ingot forming machine. Standard practice in the system of the present illustration is to leave a 35,000 pound heel in the melting furnace 1 and the holding furnace.

It is apparent from the description of FIGS. 1A, 1B that the water cooled atomizing burners 10a, 10b were placed in the roof of the reverberatory furnace 1 in a manner that allowed the products of combustion to concentrate on the valleys between the piles of scrap 5. Exact burner location was on the centerline of each door jam approximately equidistant from the front and back wall of the furnace proper.

The procedure in starting burner firing depends on the type of scrap charged. If the scrap is light, thereby representing a long charging period, burners are preferably ignited half-way through the charge cycle. If the scrap is heavy, burner ignition is started at the beginning of the charging period. Once the burners are ignited they remain on until the roof temperature climbs to approximately 2300° F. as indicated by a thermocouple or an optical pyrometer. At this stage the oxygen-fuel burners are turned off, and the bath stirred. In a majority of the melts, a roof temperature of +2300° F. is a good indication that the scrap is far enough melted so that stirring provides the necessary circulation to complete what melting is required. If stirring of the bath fails to provide the necessary energy to complete melting, the oxygen-fuel burners are reignited for a short period. In preferred operation, the fuel burner is not fired, once the bath becomes molten.

A roof-temperature thermocouple is a useful tool in determining the condition of the scrap in the furnace. This may be of a conventional type, and should be placed in the roof with the hot junction in the refractory about 1 inch from the hot surface. By observing the roof temperature, a fairly accurate bath condition can be predicted.

Using the furnace and burner arrangement described with reference to FIGS. 1A, 1B, and practicing the process of the present invention, data was collected on 17 melts spanning a 37 consecutive hour period. At the start and end of the seventeen heat run, the furnace was cleaned and drained in order to obtain melt-loss data. In addition the following data was also recorded:

(a) All charge weights
(b) Oxygen fuel burner utilization
(c) Holding furnace delays
(d) Hydrogen content of metal
(e) Oxygen and oil flow rates
(f) Times relative to the melting cycle.

Table I displays the data pertinent to the 17 heats.

Throughout the entire test the burners were fired at a 75% stoichiometric mixture. This corresponds to 225 cubic feet per gallon of oil. Total firing rate for both burners was 70 to 75 gallons per hour of oil. Oxygen line pressure was kept at 75 pounds per square inch gauge.

The results indicate that the employment of an oxy-fuel burner in the manner of the present invention for the melting of secondary aluminum is not only feasible but very productive. All areas explored during applicants' tests were either enhanced or remained unaffected by the oxygen-fuel flame.

TABLE I

| Weight of charge, lbs. | Charge time, mins. | Elapsed time to— | | Time O₂ on, hrs. | Total oil, gals. | Transfer roof temp., °F. | Metal transfer temp., °F. | Melting rate | |
|---|---|---|---|---|---|---|---|---|---|
| | | Melt charge, hrs. | Transfer melt, hrs. | | | | | actual, lbs./hr. | Net, lbs./hr. |
| 76,512 | 75 | 2.56 | 2.67 | 1.47 | 97 | 2,380 | 1,320 | 29,888 | 28,656 |
| 56,753 | 46 | 1.58 | 1.92 | 0.80 | 80 | 2,320 | T.C.N.W. | 35,920 | 29,559 |
| 39,592 | 92 | 1.86 | 2.00 | 1.20 | 82 | 2,390 | 1,320 | 21,286 | 19,791 |
| 46,772 | 23 | 1.35 | 1.80 | 1.13 | 83 | 2,410 | 1,400 | 34,645 | 25,984 |
| 37,971 | 19 | 1.12 | 2.08 | 1.03 | 74 | 2,380 | | 31,123 | 18,255 |
| 54,918 | 27 | 1.55 | 1.72 | 1.35 | 99 | 2,300 | 1,320 | 35,431 | 31,929 |
| 49,678 | 20 | 1.17 | 2.00 | 1.17 | 78 | 2,340 | 1,290 | 42,460 | 24,839 |
| 51,457 | 21 | 1.72 | 1.80 | 1.48 | 80 | 2,360 | | 29,917 | 28,587 |
| 43,045 | 32 | 1.61 | 1.80 | 1.61 | 65 | 2,300 | 1,280 | 26,736 | 23,914 |
| 43,692 | 12 | 1.83 | 2.13 | 1.83 | 75 | 2,380 | 1,350 | 23,875 | 20,513 |
| 40,403 | 30 | 1.13 | 1.83 | 1.13 | 52 | 2,120 | 1,310 | 35,755 | 22,078 |
| 42,149 | 21 | 1.08 | 1.55 | 0.73 | 47 | 2,200 | | 39,027 | 27,192 |
| 35,502 | 20 | 0.88 | 1.95 | 0.66 | 41 | 2,320 | 1,440 | 40,343 | 18,206 |
| 48,960 | 15 | 1.35 | 2.47 | 1.30 | 87 | 2,300 | 1,450 | 36,267 | 19,822 |
| 40,941 | 29 | 1.48 | 2.37 | 1.03 | 64 | 2,300 | 1,450 | 27,663 | 17,275 |
| 45,014 | 24 | 1.38 | 1.63 | 1.18 | 67 | 2,300 | 1,450 | 32,619 | 27,616 |
| 43,751 | 24 | 1.30 | 2.13 | 1.35 | 77 | 2,380 | | 33,654 | 20,540 |

One of the most important aspects of the tests was the effect that the described process had on melt loss. This was closely evaluated; and, for the seventeen heats, was calculated to be 2.98% by weight. This figure was one percent lower than the plant average of 3.98 percent, using prior practice, and represents a reduction of at least 25 percent from melt loss in prior-art operations not using the techniques of the present invention. It is believed that the loss rate could have been lowered if metal from the melter had been able to flow without interruption to the holder, in the tests undertaken.

The calculated melting rate for the 37 hour period was 31,820 pounds per hour. This represents the melting rate calculated from the time the scrap was charged to the time the metal was ready for transfer to the holder. It does not include +8 hours of delays that resulted from the holding furnace operation. The 31,820 pounds per hour represents the melting rate that could be maintained providing that this problem were elminiated in the balance of the operation. This level of melting was 98.87 percent above the best previous output of this furnace, using prior art techniques. Taking into consideration holding furnace delays, net melt rate for the 37 hours was 21,543 pounds per hour or an increase of 34.6 percent. This melt rate represents the level of melting that can be sustained with present facilities. During the 37 hour period of applicant's tests, the holding furnace was able to operate continuously without interruption for lack of hot metal.

It was found that the hydrogen content of the molten aluminum was unaffected by the oxygen fuel operation. Analysis performed before and after fluxing showed no variation from the normal prior art operation in this respect.

There was no indication of magnesium and/or aluminum volatilization during the test process. Prior to the test there was ome concern that the hazard of a potential explosion or an uncontrollable exothermic reaction might result if volatilization had occurred as a result of the higher flame temperature. Accordingly, close attention was given to maintaining bath temperatures below the point of volatilization.

The furnace refractory appeared normal during the oxygen fuel firing. The roof temperature was completely controllable, and for the most part was maintained below the 2450° F. upper limit.

Oxygen was supplied from a conventional station mounted on a flatbed trailer. Oxygen preferred for the purposes of the present invention is a commercial grade, 99.5% pure, which is manufactured by Air Reduction Company, Incorporated, to the following specifications:

TABLE II

Typical analysis impurity content

| | |
|---|---|
| Argon | percent (by volume) 0.15–0.3 |
| Carbon dioxide | do 0.0005 |
| Hydrocarbon ($C_2H_2$) | do 0.00002 |
| Nitrogen | do 0.1–0.25 |
| Maximum dew point | °F 80 |
| Water vapor | p.p.m 7.8 |

Oil was selected as the fuel for the above-described tests due to its availability and cost. An oil preferred for the proposes of the present invention is identified as No. 6 heavy industrial fuel oil (Federal Specification Board, Bunker Oil "C") identified in the United States Bureau of Standards Commercial Standard CS 12-29. Another oil suitable for the purposes of the present invention is identified as No. 2 industrial fuel oil, according to the standard of the American Society for Testing Materials.

Burner operation was automatic. This was accomplished by the time-delay relays and solenoid valves described with reference to FIG. 4 of the drawings. The overall arrangement of the oxygen and oil systems was substantially as shown and described with reference to FIG. 3 of the drawings.

FIGS. 5A, 5B and 6A, 6B show variations of the process of the present invention described with reference to the furnace arrangement of FIGS. 1A, 1B, in which the two supplementary oxy-oil burners of a self-atomizing tip mixer type are replaced by a single supplementary oxy-gas burner of the rocket type. In the embodiment described with reference to FIGS. 1A, 1B, the two oxy-oil tip mix burners are interposed in the roof of the furnace at positions symmetrically spaced relative to the position of the flue; whereas, in the embodiments shown in FIGS. 5A, 5B and 6A, 6B the single oxy-gas auxiliary rocket burner is disposed in the sidewall of the furnace, downwardly directed at a slight angle. In each of the embodiments, a salient feature is that the flame from the oxy-fuel burner does not contact the charge, approximately 90 percent of the combustion being completed before the combustion products reach the surface of the melt.

Figure 5A:
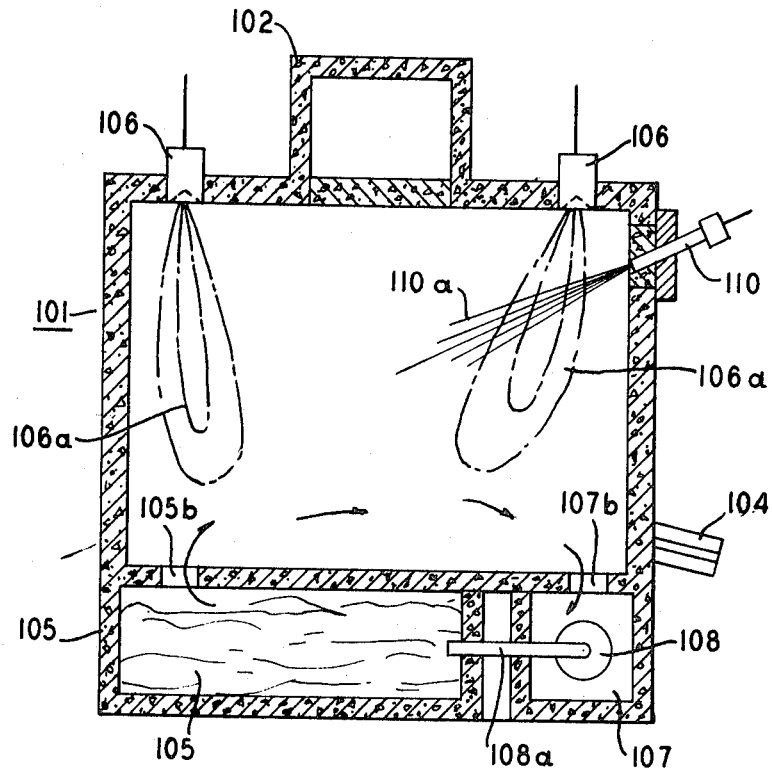
FIGS. 5A and 5B show in plan view and front elevation respectively, a side hearth aluminum furnace including an oxy-gas burner interposed through the furnace sidewall.
Figure 5B:
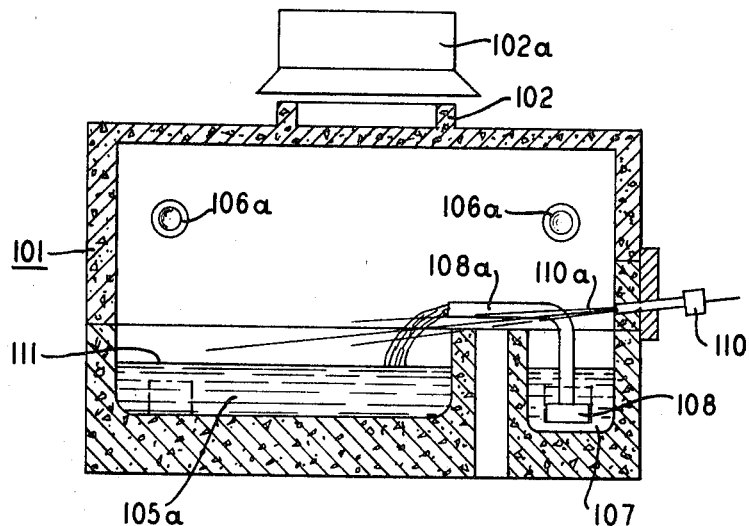

Referring now to FIGS. 5A, 5B, there is shown in plan view and in cross-section, respectively, a side hearth reverberatory furnace 101 rated at 45,000 pounds capacity for melting secondary aluminum. The internal dimensions of the inner chamber are 14 feet across and 10 feet from front to back, with a ceiling 6 feet high. The walls and ceiling, which are approximately a foot thick, are formed of refractory bricks, such as alumina. Centered along the back wall is a flue 102 having walls about 6 inches thick, which is about 4 feet wide and 3 feet deep, and extends about 8 inches above the roof of the furnace. A rectangular scrap well 105, forming an inner chamber about 9½ feet long and 3 feet wide, and having refractory brick walls about 6 inches thick and a base about 1½ feet thick, is built partway across the front of the furnace to a height of about 2½ feet above the base. This serves to accommodate the piles of scrap material 105a to be melted. An opening 105b, about a foot wide, in the partition between the scrap well 105 and the furnace proper, permits the molten aluminum to flow from one into the other. At the front end of the furnace opposite the scrap well 105 is constructed a sump 107, 3 feet square and 3 feet high, and having walls 6 inches thick. A channel one foot wide and 4 feet long separates the sump 107 from charging well 105. Interposed in the sump 107 is a molten metal pump 108. Suitable for this purpose, for example, is a pump of 5000 pounds per minute maximum capacity, having an air motor of 3.6 horsepower at 900 revolutions per minute, such as, for example, aluminum pump Model Number D–30, manufactured by the Metal Pumping Services Branch, Process Equipment Division of the Carborundum Company, Solon, Ohio 44139, and advertised in their brochure entitled "Metaullics." The spout 108a of pump 108 extends into scrap well 105. An opening 107b in the wall separating the sump from the furnace permits a stream of molten metal to be drawn into the bottom of the sump. The molten metal is then pumped out of the sump and into the scrap well 107 at the rate of, say, 5000 pounds per minute, building up a molten bath to a level of about one foot and a half, surrounding the scrap charged into the furnace.

The furnace 101 is conventionally fired by two small low pressure air-fuel burners 106, which are each designed to direct into the furnace 5,500,000 British Thermal Units per hour. The burners 106 which are supplied with air and gas from a conventional system (not shown) are of a gas-air type manufactured by the Hauck Manufacturing Company of Lebanon, Pa. The barrels of burners 106, which are each about one foot in outer diameter, are symmetrically disposed in the back wall of the furnace, with their axes perpendicular to the furnace wall, and each located about 2¼ feet in from the respective external back corner, and centered about 5½ feet above the floor of the furnace. The flames, directed inwardly at a slight angle with a velocity of about 20 feet per second, extend about 7½ feet from the respective burner nozzles. They have a maximum temperature of about 3200° F.

The single auxiliary water-cooled oxy-gas burner 110 is located in the sidewall of the furnace 101, with its axis about 2 feet in from the external back corner, and 2¼ feet above the furnace floor. The axis of the burner is directed inwardly at an angle of about 20° with the normal to the furnace wall, and downwardly toward the furnace floor at an angle of about 5° with the horizontal plane.

Figure 7A:
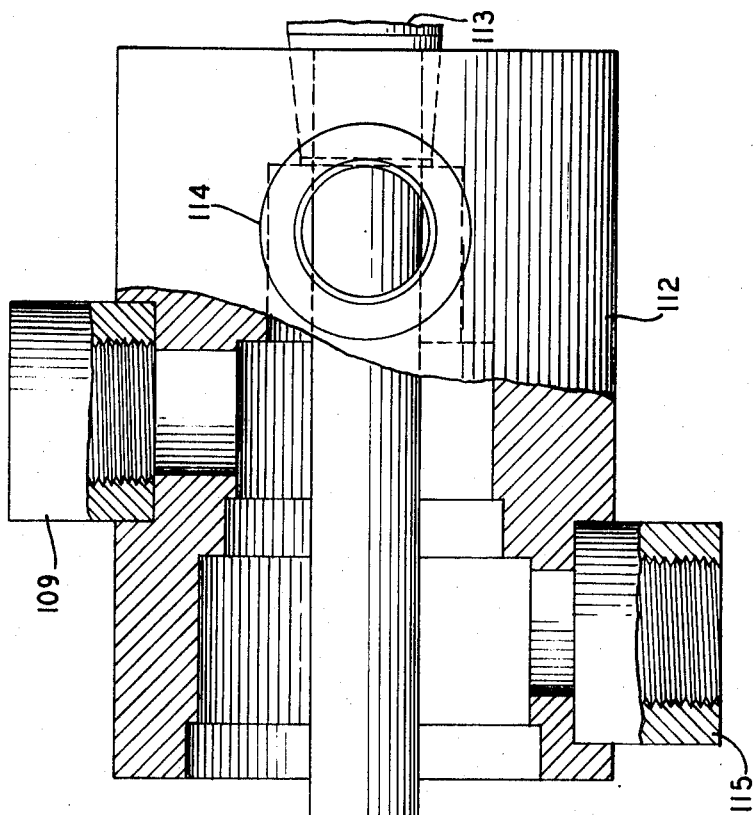
FIGS. 7A and 7B show in longitudinal section and in cross-section respectively, a rocket burner (with water jacket removed) of the type employed in the furnace structures shown in FIGS. 5A, 5B and 6A and 6B.
Figure 7B:
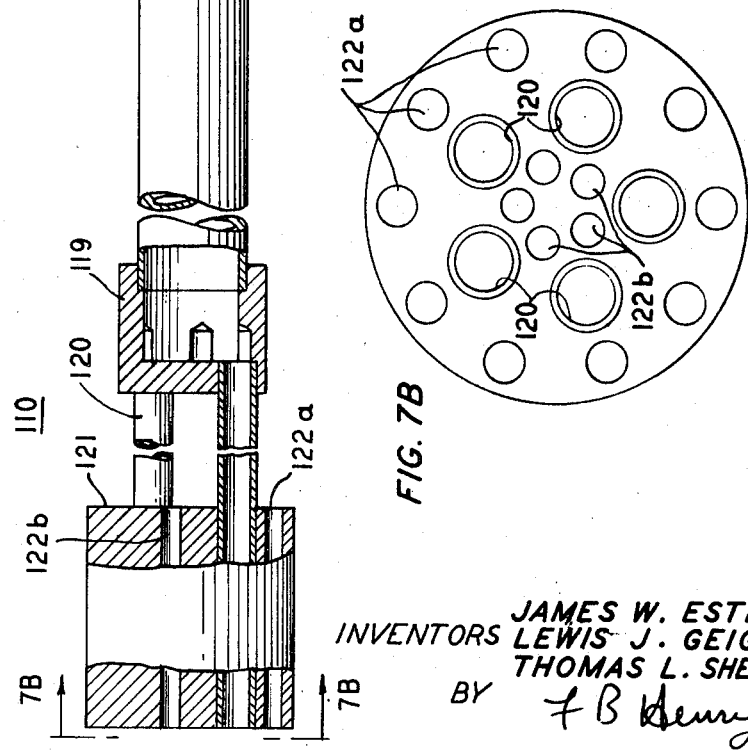

The inner burner barrel of the oxy-gas rocket burner 110 may take the general form indicated in FIGS. 7A, 7B of the drawings, which respectively show the inner burner barrel in longitudinal elevation and cross-section. This is designed to include a similar water jacket to that shown with reference to the burners of FIGS. 3A, 3B, including concentric pipes 16, 17, and 18, only the internal burner portions being modified as shown in accordance with the burner insert indicated in FIGS. 7A, 7B.

Referring to the latter figures, there is shown an axially disposed fuel gas tube 118 of stainless steel, which is ¾ inch in outer diameter which terminates at its outer end in a male connector 113, for connection to the branch gas line in the gas supply system to be described presently with reference to FIG. 8. At the inner end, tube 118 is fitted into and fastened with silver braze in the cup-shaped opening of a cylindrical brass adapter 119. The adapter 119, which terminates 2½ inches from the terminal end of the burner block 121, accommodates a bundle of five stainless steel tubes 120, which are nearly parallel to the principal axis of the burner and disposed in symmetrical array about the burner axis. The terminal ends of tubes 120 pass through the burner block 121. The burner block is a copper cylinder which is slidably fitted inside of the inner pipe 16 of the water jacket 11 of FIGS. 3A, 3B. In addition to fuel gas tubes 120, burner block 121 includes a plurality of parallel bores for oxygen vents 122a and 122b, which are symmetrically arranged with their centers in two concentric circles, the outer one comprising vents 122a and the inner one comprising vents 122b.

As in burner 10 previously described with reference to FIGS. 3A, 3B, oxygen flows through coupling 114 in burner 110 into burner body head 112. The annular space between the inner water jacket pipe 16 and the gas tube 118 serves to conduct oxygen to the burner block 121 where it passes through orifices 122a and 122b. Gas passes in through the connector 113, and pipe 118 to adaptor 119, where it is fed into the five gas tubes 120 in the burner block 121.

Referring to FIG. 8 of the drawings, there is shown the supply systems for the oxy-gas burner 110, described in detail with reference to FIGS. 7A, 7B. The water cooling system is similar to that described with reference to the oxy-oil burners of FIGS. 2A, 2B, with water entering through valve 125 and flexible hose 124 into the intake orifice 109 of water jacket 111. The return stream passes through exhaust orifice 115 under control of pressure sensitive contacts 128 and flow sensitive contacts 127, passing through return conduit 126 to a drain 129.

Oxygen for the burner 110 is derived from the liquid oxygen station 137, which is similar in form to station 37 described with reference to FIG. 3. The liquid oxygen in station 137 is maintained at −240° F. under a pressure of 165 pounds per square inch absolute. The oxygen passes from station 137 through a conduit into a vaporizer 138, of the type of vaporizer 38 described with reference to FIG. 3, where it is converted from liquid at a temperature of −240° F. and pressure of 165 pounds per square inch absolute, to a vapor at 40° F. at the same pressure. The oxygen vapor passes at a rate of 6,000 cubic feet per hour through a conventional ball valve 139. The stream then passes through pressure contacts 142 which are arranged to open the circuit if the oxygen pressure exceeds a preselected value, and pressure gauge 141, to the conventional flowmeter 143. From flowmeter 143, the stream passes through junction 140, normally passing through the normal 1½ inch conduit, leading through a conventional ball valve 144a and conventional globe valve 146a to the solenoid-operated valve 145a. Alternately, if reduced operation is desired, a smaller stream is passed from the junction 140 through a ½ inch conduit leading through alternate ball valve 144b and globe valve 146b, bypassing valves 144a and 146a which remain closed.

Solenoid-operated valve 145a, which is of the type previously described, is normally closed unless actuated by solenoid 145 in a circuit which will be described hereinafter with reference to FIG. 9. Assuming valve 145a is operated, the stream passes through the spring-loaded check valve 149, the output of which is connected through a 1½ inch inner diameter flexible hose to the intake orifice 114 of the oxy-fuel burner 110.

The natural gas is derived from gas storage station 150, which may be any source of gas suitable for the purposes of the present invention, such as a conventional gas pipe line. The gas passes from source 150 under control of conventional ball valve 152 into the conduit 151 at a pressure of 35 pounds per square inch absolute.

The gas stream passes through the conduit 151 under control of pressure switch 160, which is designed to open when the gas exceeds a preselected pressure. The stream passes through pressure gauge 161 and conventional flowmeter 162 to the junction 157, where the stream normally passes through ball valve 158a and globe valve 159a to the normally-closed solenoid operated valve 164a. An alternative by-pass is provided around valves 158a and 159a by the ½ inch pipe passing through the auxiliary globe and ball valves 158b and 159b. The normally-closed valve 164a, which is actuated by solenoid 164, under control of circuit means to be presently described with reference to FIG. 9, passes the stream of gas through check valve 167 into the flexible 1½ inch hose 166. The latter is connected to gas terminal 113 of the oxy-gas burner 110. The supply streams of oxygen and gas are thus passed through rocket burner 110 and are post-mixed beyond its nozzle to form a high velocity flame, in a manner to be described presently.

Figure 9:
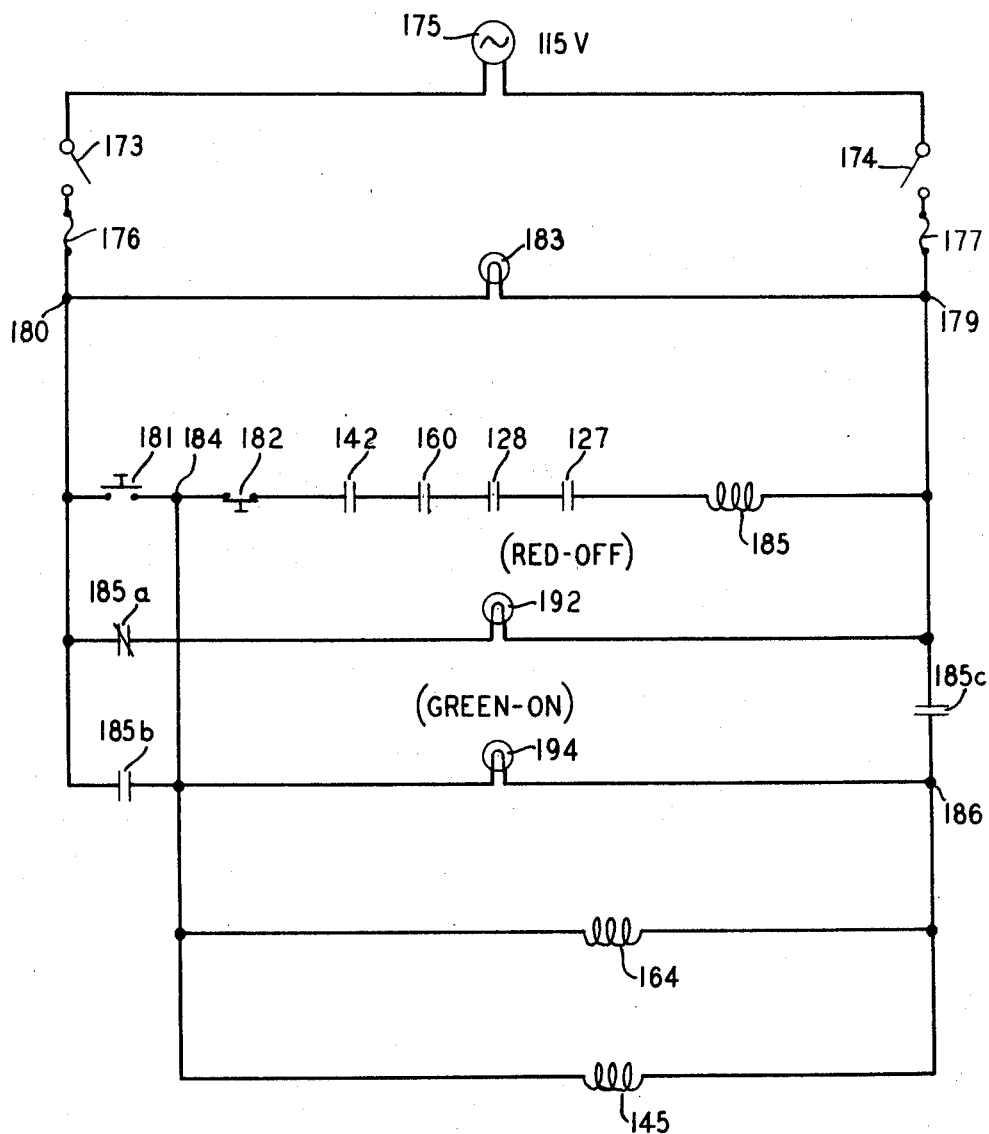
FIG. 9 shows a typical electrical circuit schematic for the rocket burner system of FIGS. 7A and 7B.

The electrical control system for the oxy-gas supply system of FIG. 8 is shown in FIG. 9 of the drawings.

The power source 175, which may be, for example, a conventional 115 volt, 60 cycle per second, alternating current line source, is connected at its terminals through a pair of single throw switches 173 and 174, which are respectively connected through 10 ampere fuses 176 and 177 to junctions 180 and 179. The amber pilot light 183 is connected between the latter to indicate when the power is turned on. A push-to-start switch 181 is connected between junctions 180 and 184. The control relay 185 is connected between the junctions 184 and 179 in series with the push-to-stop switch 182, the oxygen and oil pressure contacts 142 and 160 respectively, and water pressure and flow contacts 128 and 127 respectively. (See FIG. 8 for the location of these contacts in the piping circuit.) Associated with relay 185 are normally closed contacts 185a, and normally open contacts 185b and 185c. Normally closed contacts 185a are connected in series with the red-off pilot light 192, between the junctions 180 and 179, so that the red light shows when the circuit of relay 185 is for any reason de-energized.

Normally open contacts 185b and 185c close upon operation of relay 185 to energize the green-on pilot light 194, which is connected between junctions 184 and 186, in parallel with the gas solenoid 164 and the oxygen solenoid 145, which are simultaneously energized, to turn on the oxygen and gas supply streams to the burner 110 (see FIG. 8).

Using the arrangement shown in FIGS. 5A, 5B including a 1½ inch barrel water-cooled rocket burner 110 of the form shown in FIGS. 7A, 7B and having an oxygen and gas supply system of the general form indicated in FIG. 8, under control of an electrical circuit such as shown schematiccaly in FIG. 9, tests were carried out over a four day period. During this period, there was demonstrated a 100 percent increase in production and a 50 percent decrease in fuel consumption, with no damage to the furnace refractories, as compared to prior art operation of the furnace using only the air fuel burners 6.

The oxygen used in the operation about to be described is of a commercial grade of purity meeting the specifications set forth in Table II in the previous description with reference to the operation of the oxy-oil burners of FIGS. 3A, 3B.

Gas to be used as fuel in the burners 110 is preferably natural gas.

Furthermore, any of the following hydrocarbon oils or gases may be employed as fuels for the rocket burners of the present invention, such as, for example, methane $CH_4$, ethane $C_2H_6$, propylene $C_3H_6$, propane $C_3H_8$, or fuel oils Grades No. 1 to No. 6 as enumerated on page 66 of Babcox & Wilcox, Useful Tables, 8th edition, 1963, either singly or in various mixtures (with suitable atomizer tips).

The two conventional air-fuel burners 106 are first turned on, consuming air and fuel, which in the present case for convenience, is natural gas from the same source used to fuel the oxy-gas burner 110.

To start up operation of the oxy-gas burner 110, switches 173 and 174 to power source 175 are closed. For the starting operation, main line valves 144a and 146a are closed and auxiliary valves 144b and 146b are opened, in the oxygen system; and, main line valves 158a and 159a are closed and auxiliary valves 158b and 159b in the gas system are opened. This provides reduced flow for the lighting operation. Then button 181 is depressed to open the solenoid controlled valves 164a and 145a. This permits oxygen to flow from conduit 148 into oxygen terminal 114, and gas to flow from conduit 124 into gas terminal 113 of the burner 110. During the initial stages, the gas flow rate into the burner 110 is at the rate of 50 standard cubic feet per hour, at a pressure of ½ pound per square inch gauge, and ambient temperature; and oxygen flow is at the rate of 50 standard cubic feet per hour, at a pressure of ½ pound per square inch gauge.

Assuming the furnace to be operating, the burners are immediately ignited as soon as gas flows into them. As soon as the flame is lighted in the burners 110, valves 144b, 146b, 158b, and 159b are closed, and main line valves 144a, 146a, 158a, and 159a are opened, permitting oxygen and gas to flow into the burner 110 at the normal rate. During the tests, the oxy-fuel ratio was maintained at approximately 1.5:1.

The flame 110a, which is seated at the nozzle of burner 110, is preferably designed to have a velocity within the range 2500 to 3500 feet per second, and a maximum flame temperature within the range 4300° to 4800° F., contrasted to the flames of the air fuel burners 106. A turbulent flame is propagated by burner 110, comprising a series of eddies, rather than a laminar combustion area. The burner 110 is so directed that at least about 90 percent of the combustion is completed before the combustion products come in contact with the bath comprising molten aluminum overlaid with a coating of aluminum oxide.

Charging of the furnace 101 is handled with standard forklift trucks and payloaders with special mounted pallets or metal containers which charge directly into the charging well. The average individual charge is approximately 500 pounds. The charge varies from very light foil to very heavy material such as returned pigs.

After the charge is melted, the furnace is tapped through tap 104 onto four sow molds sitting on the floor adjacent to the furnace. Each of these sows weighs approximately 950 pounds leaving a 41,200 pound heel in the furnace for the next charge.

Although every effort was made to keep the furnace of FIGS. 5A, 5B operating at top speed, because of certain conditions beyond the control of the operators, operation at the optimum rate was achieved for only about three hours during the four day test period.

The recommended gas flow into the burner 110 was 2000 to 3000 cubic feet per hour at a minimum pressure of 18 pounds per square inch absolute. However, during the test period it was not always possible to achieve this optimum. It was further determined a more uniform flow production can be achieved in the furnace arrangement of FIGS. 5A, 5B by throttling back the primary burners 6 to a total of 6 million British thermal units. The reduction in fuel to be derived from this change in operation would cause a sufficient reduction in the fuel used in the conventional burners to cover the cost of the oxygen used in auxiliary burner 110, while at the same time increasing the furnace production up to 50 percent over prior art production of the same furnace without the auxiliary burner. During these tests, the over all melting rate in the furnace of FIGS. 5A, 5B increased from approximately 3000 to 4000 pounds per hour under prior art practice up to as high as 8200 pounds per hour. A typical melting rate during this four day period of the tests using the auxiliary burner in accordance with the present invention was approximately 6000 pounds per hour. See Table III.

TABLE III.—CONTROL DATA
Furnace of FIGS. 5A, 5

| Test | Time elapsed in hrs. | Charge (lbs.) | Tap (lbs.) | Percent dross | End burner furnace rate, c.f.h. | Airco, c.f.h. O₂ | Burner natural gas, c.f.h. | Temperature, °F. Bath | Roof | Sidewall |
|---|---|---|---|---|---|---|---|---|---|---|
| I | 8 | 16,535 | 18,900 | | 11,000 | 1,500 | 1,000 | 1,460 | | 2,260 |
| II | 8 | 18,385 | 11,740 | | 6,000 | 1,800 | 1,200 | 1,390 | 2,075 | 2,050 |
| III | 8 | 20,350 | 15,225 | | 6,000 | 2,100 | 1,400 | 1,500 | 1,730 | 1,720 |
| IV | 8 | 28,582 | 7,125 | 2,525 | 6,000 | 1,500 | 1,000 | 1,400 | 2,250 | 2,190 |
| V | 8 | 17,335 | 11,520 | 1,790 | 6,000 | 1,500 | 1,000 | 1,400 | 2,190 | 2,170 |
| VI | 8 | 16,305 | 15,675 | 2,575 | 6,000 | 1,500 | 1,000 | 1,500 | 2,150 | 2,150 |

This higher melting rate was maintained over a three hour period with the primary burners firing at a reduced rate of 6 million British thermal units per hour with a melt loss range from 8 percent to 10 percent, which is somewhat unrealistic in view of the fact that conditions during this test were not optimum, since there were several delay or holding periods at temperatures which accounted for the high dross. Previous tests have shown that a neutral or reducing flame such as was employed actually reduces dross.

The high velocity, low luminosity, oxy-natural gas flame seemed to be ideal for the present practice. Over a four day period very little tendency for the present burner to excessively heat the sidewall and roof was noted.

Oxygen consumption averaged 500 to 800 cubic feet per ton of aluminum and total natural gas averaged 3000 cubic feet per ton of aluminum cast.

The chemistry of the metal was not affected by the present burner.

Figure 6A:
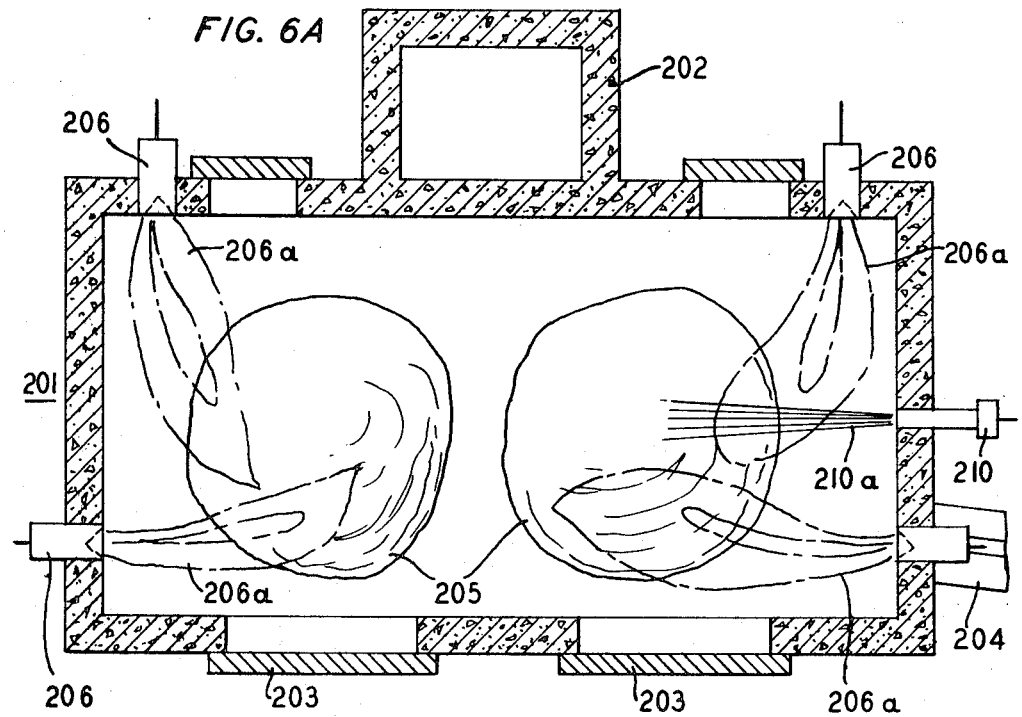
FIGS. 6A and 6B show in plan view and front elevation an aluminum reverberatory furnace with an alternative arrangement of an oxy-gas burner interposed through the sidewall.
Figure 6B:
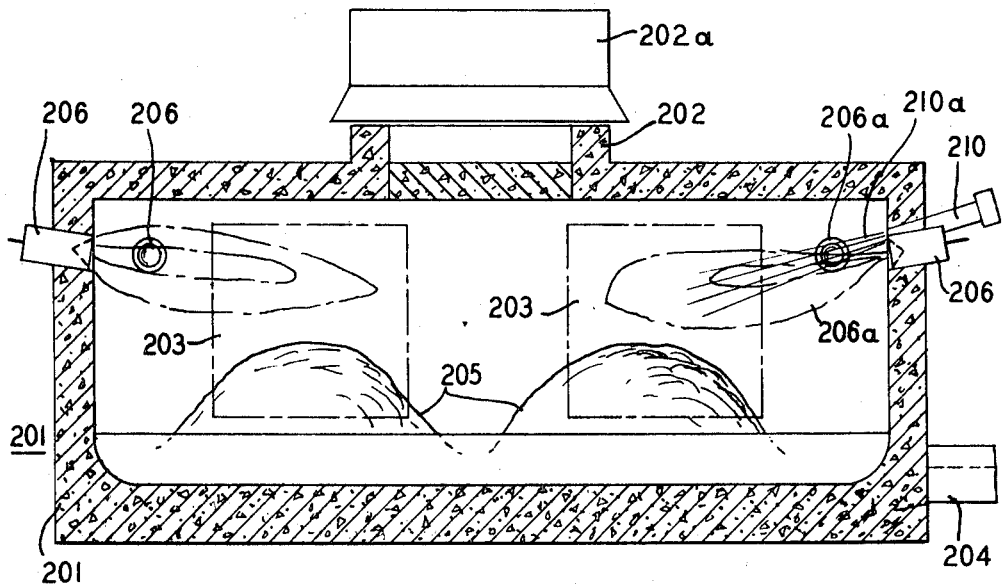

Referring to FIGS. 6A, 6B, there is shown in plan view and side elevation, respectively, a further variation applying the process in accordance with the present invention for remelting aluminum to a different furnace.

The furnace 201, which is constructed of refractory brick, of alumina or the like, on a base 1½ feet thick and having walls one foot thick, is rectangular with an inner chamber 24 feet long and 11 feet wide, and a ceiling 6½ feet high. A flue 202, located at the back of the furnace, is 5 feet long and 3½ feet high, extends a foot above the outside level of the rof, and is topped by a hood 202a.

At the front of the furnace 201 are a pair of iron, water-cooled doors 203 which are 5½ feet square, symmetrically spaced about 4½ feet apart, and based about 2 feet up from the floor of the furnace. A spout 204 located near the front right-hand corner leads off just below the level of the furnace floor.

Furnace 201 is equiped with four conventional air-fuel burners 206 which are supplied with air and gas fuel from a conventional source (not shown). All of these burners are located near the ceiling of the furnace, two in the opposite sidewalls centered at positions 2 feet in from the front inside corners, and having their flames directed inwardly. The two other burners 206 are located in the back wall of the furnace 201, each centered about 2½ feet from the respective external corner, and having their flames directed inwardly.

The four conventional burners 206 are supplemented by a single 3 inch barrel water-cooled oxy-gas rocket burner 210, interposed in the left-hand sidewall near the ceiling and centered about 6 feet in from the front corner. Burner 210 is normal to the sidewall in the horizontal plane, and is directed downwardly at an angle of about 12° in vertical plane.

Burner 210 is generally similar in form to the rocket burner 110 described in detail with reference to FIGS. 7A, 7B of the drawings, except for a difference in scale. Burner 210 is a water-cooled 3 inch diameter rocket burner, with a 4½ inch outer diameter water jacket, whereas the former burner 110 is a 1½ inch rocket burner with a 2½ inch outer diameter water jacket. Burner 210 was supplied with oxygen and gas through a system generally similar to that disclosed in FIG. 8 of the drawings under control of an electrical circuit similar to that shown in FIG. 9.

During operation, the four conventional air-fuel burners 206 were operated to supply a total of approximately 25 million British thermal units per hour into the furnace of FIGS. 6A, 6B; whereas, the oxy-gas burner 210 was generally operated to supply supplemental heating of 5 million British thermal units per hour.

The secondary aluminum melting furnace 201 shown in FIGS. 6A, 6B is a 55,000 pound capacity reverberatory furnace of conventional design, which is tapped either into a holding furnace, or a water-cooled mold set up for casting conventional slabs which are processed into various sizes and grades of sheet aluminum. It operates on a four hour cycle from charge to tap, charge weights varying from 21,000 pounds up to 48,000 pounds, depending on the amount in the holder and the grades being produced. Using regular prior art practice, the production of this furnace approximated 13,000 pounds per hour; whereas, using the auxiliary oxy-gas rocket burner in accordance with the techniques of the present invention, the furnace production averaged 22,837 pounds per hour.

Burner 210, which was positioned in the furnace sidewall flush with the inner wall, has its center 6½ feet in from the front face of the furnace and about 1 foot below the inner ceiling of the furnace. The high velocity flame is directed normal to the wall in a horizontal plane, and downward at an angle of about 12° in the vertical plane, so that it is directed slightly above the scrap. This permits approximately 90 percent of the combustion to be completed before the combustion products reach the scrap 205.

The oxygen flowed into the burner 210 at the rate of approximately 6,000 standard cubic feet per hour. Gas flowed into the burner 210 at the rate of approximately 4,000 standard cubic feet per hour. This produced a high velocity flame having a maximum temperature of 5,000° F., extending about 3 feet from the nozzle.

The four conventional burners 206 were operated with air flowing at the rate of 160,000 cubic feet per hour and natural gas flowing at the rate of 15,000 standard cubic feet per hour. These produced a coherent flame having a maximum temperature of about 3,200° F. and extending approximately 8 feet from the burner nozzle.

During tests performed with the furnace arrangement shown in FIGS. 6A, 6B, 23 heats were produced over a five day period, the results of the tests being indicated in Table IV. Oxygen consumption was 955 cubic feet per heat; and natural gas consumption was 639 cubic feet per heat.

As shown by Table IV the use of the auxiliary rocket burner 210 in the manner indicated reduced heating time by over 50 percent, with an equivalent decrease in fuel consumption. In fact, the plant output increased by 201 pounds per minute, operating by conventional methods, to 372 pounds per minute, operating with auxiliary burner 210 in accordance with the present invention. The chemistry of the metal including dissolved gases was not affected by use of burner 210. The dross recovery was satisfactory and the furnace remained at normal operating temperatures without any detrimental effect on furnace refractories.

SUMMARY

The apparatus and techniques of the present invention as disclosed herein for melting aluminum in a reverberatory furnace, involve the use of one or more oxy-fuel

TABLE IV

| Heat number | Charge, lb. | Oxygen Flow, c.f.h. | Oxygen Total used | Natural gas Flow, c.f.h. | Natural gas Total used | Maximum Roof | Maximum Wall | Melt time | Lb./minute, melt time |
|---|---|---|---|---|---|---|---|---|---|
| 1 | 33,165 | 6,000 | 10,900 | 4,000 | 7,200 | 2,200 | 2,130 | 1:48 | 310 |
| 2 | 29,380 | 6,000 | 10,500 | 4,000 | 7,000 | 2,160 | 1,850 | 1:44 | 280 |
| 3 | 19,650 | 6,000 | 6,600 | 4,000 | 4,400 | 2,180 | 2,220 | 1:08 | 285 |
| 4 | 48,701 | 7,500 | 15,700 | 5,000 | 10,500 | 2,130 | 2,100 | 2:07 | 380 |
| 5 | 34,355 | 8,250 | 12,000 | 5,500 | 8,100 | 2,100 | 2,120 | 1:28 | 390 |
| 6 | 27,684 | 7,500 | 9,900 | 5,000 | 6,600 | 2,140 | 2,090 | 1:19 | 350 |
| 7 | 21,401 | 7,500 | 7,500 | 5,000 | 5,000 | 2,100 | 2,130 | 1:00 | 355 |
| 8 | 34,645 | 7,500 | 11,100 | 5,000 | 7,400 | 2,130 | 2,170 | 1:28 | 392 |
| 9 | 31,114 | 7,500 | 9,200 | 5,000 | 6,200 | 2,130 | 2,070 | 1:14 | 420 |
| 10 | 49,848 | 7,500 | 13,900 | 5,000 | 9,400 | 2,100 | 1,850 | 1:50 | 450 |
| 11 | 26,615 | 7,500 | 7,700 | 5,000 | 5,100 | 2,000 |  | 1:02 | 430 |
| 12 | 18,215 | 7,500 | 5,400 | 5,000 | 3,600 | 2,190 | 2,230 | 0:43 | 430 |
| 13 | 27,872 | 7,500 | 7,800 | 5,000 | 5,200 | 2,120 | 2,130 | 1:03 | 450 |
| 14 | 26,174 | 7,500 | 8,100 | 5,000 | 5,400 | 2,120 | 2,190 | 1:05 | 400 |
| 15 | 26,219 | 7,500 | 7,700 | 5,000 | 5,100 | 2,180 | 2,240 | 1:02 | 430 |
| 16 | 30,498 | 7,500 | 11,600 | 5,000 | 7,700 | 2,100 | 2,150 | 1:33 | 330 |
| 17 | 26,869 | 7,500 | 8,600 | 5,000 | 5,750 | 2,280 | 2,100 | 1:09 | 380 |
| 18 | 22,827 | 7,500 | 9,300 | 5,000 | 6,200 | 2,120 | 2,120 | 1:15 | 310 |
| 19 | 28,385 | 7,500 | 11,200 | 5,000 | 7,800 | 2,200 | 2,260 | 1:28 | 320 |
| 20 | 27,779 | 7,500 | 8,100 | 5,000 | 5,400 | 2,100 | 2,150 | 1:05 | 430 |
| 21 | 21,231 | 7,500 | 8,800 | 5,000 | 5,900 | 2,120 |  | 1:10 | 280 |
| 22 | 26,883 | 7,500 | 8,900 | 5,000 | 6,000 | 2,100 |  | 1:11 | 380 |
| 23 | 27,802 | 7,500 | 9,100 | 5,000 | 6,100 | 2,100 | 1,990 | 1:13 | 380 |
| Average | 29,013 |  | 9,550 |  | 6,390 |  |  |  | 372 | burners mounted in fixed positions with their nozzles flush against the inner furnace wall. The burners are disposed and designed to interpose into the furnace a highly turbulent, high temperature flame, combustion of which is about 90 percent complete before the flame products contact the charge or molten bath. The ratio of oxygen to fuel in the oxy-fuel burners is at least about 65 percent of the stoichiometric requirement for complete combustion, and preferably about 75 percent, to provide a slightly reducing flame.

In one embodiment the burners may take the form of oxy-oil burners, in the manner of FIGS. 1A, 1B, using self-atomizing tip-mixers into the nozzles of which have been interposed swirlers to impose on the energizing atomized oil stream an angular velocity. In this embodiment, the flame velocities range between 500 and 1500 feet per second, being preferably in excess of 1000 feet per second, at flame temperatures ranging between 3000° and 5000° F.

In another embodiment, rocket burners are employed having flame velocities ranging between 1000 and 3500 feet per second, preferably in excess of 2000 feet per second, at flame temperatures within the range 3000° to 5000° F. In each case, the auxiliary burners are designed to supply between 20 and 30 percent of the heat energy required to melt the charge, the balance of the heat being derived from conventional low velocity, low pressure air-fuel burners, having flame velocities, in most cases, only about ⅛ to ⅒ as great as those of the oxy-fuel burners, and maximum possible flame temperatures only about 7/10 as great. One feature of the invention is that arrangements may be made through the burner control circuit to turn off the oxy-fuel burners at about the time the charge is melted. This may be determined by one or more pyrometers mounted near the ceiling of the furnace. In the embodiment of FIGS. 1A, 1B the ceiling temperature was maintained below 2450° F.; whereas in the embodiment of FIGS. 6A, 6B the burners were turned off when the roof temperature reached 2100° F.

The described tests have shown that the techniques and apparatus of the present invention, disclosed in the several embodiments herein described for melting aluminum, have increased the melting rate by between approximately 50 and 100 percent, with an accompanying decrease in fuel consumption through the primary and auxiliary burners, and, in general, a substantial decrease in melt loss through dross and vaporization of aluminum. This has been achieved without affecting the hydrogen content of the metal, or the general chemical analysis of the metal product. Moreover, flue gas analysis made during the tests revealed a high carbon dioxide content, and lower flue gas temperature during the oxy-fuel burning in accordance with the present invention, compared to air burning, decreasing air pollution throughout the neighborhood of the plant.

One theory to account for the successful results achieved by use of the methods and apparatus of the present invention is that the presence of the turbulent or high velocity, high temperature, slightly reducing oxy-fuel flame, as an auxiliary to the conventional heating elements of the furnace, serves to introduce strong convection currents in the furnace which convey the heat energy to the charge, without the high temperature flame coming in contact with the charge. The substitution of oxy-fuel burners, designed and disposed in accordance with the present invention, for additional burners of the air fuel type, permits the addition of up to 30 percent more heat energy without refractory damage, and with little or no increase in flue gas temperature, thereby improving the efficiency of heat transfer to the charge. Moreover, the diluting effect of nitrogen, as in air-fuel burners, has a number of disadvantages, including a chilling of the flame, and a reduced rate of flame propagation or flame velocity. This latter factor, together with the specific designs of the post-mix burners, contributes to the degree of mixing taking place in the furnace, which is an important factor in the development of high heat transfer efficiencies. Moreover, nitrogen, as in air-fuel burners, has a tendency to absorb more heat energy than it readily gives up to the charge, the excess heat being carried up the flue, with a reduction in the heating efficiency of the furnace.

Because of all of these factors, the use of oxy-fuel burners in the manner of the present invention enables the aluminum charge to be heated up and melted at an accelerated rate, without oxidation or vaporization of a substantial percentage of the aluminum. In addition to causing a loss of product, this might also contribute to a possible explosion. It will be noted that whereas aluminum vaporizes at a temperature of 4500° F., the oxy-fuel burner flame is characterized by maximum temperature of up to 5000° F. It is thus mandatory to keep the aluminum from being exposed directly to the maximum flame temperature.

Another feature is that in the case of the oxy-gas flame, which is nonluminous, less heat is lost by radiation. Although the slightly reducing character of the flame decreases the formation of oxides during the melting process, the nearly complete combustion reduces the amount of hydrogen available to become dissolved in the product aluminum, or to form water vapor during the process.

It will be apparent to those skilled in the art that notwithstanding the fact that several different embodiments have been described herein to illustrate the principles of the present invention, the scope of the invention is not restricted to the particular configurations and combinations shown. For example, it is contemplated that burners of the oxy-oil self-atomizing tip-mixer type can be interchanged with oxy-gas rocket burners, depending on the fuel reequirements in a particular location. In addition to those disclosed herein, suitable rocket burners for the purposes of the present invention include those disclosed and/or claimed for example, in T. L. Shepherd patents 3,092,166, issued June 4, 1963 and 3,127,156 issued Mar. 31, 1964, and in W. B. Moen et al, Pat. 3,135,626, issued June 2, 1964. Moreover, it will be apparent that whether a single auxiliary burner, or a plurality of auxiliary burners, should be used, and the orientation of the auxiliary burners, is a matter to be determined in applying the principles of the present invention to each specific furnace environment in which the invention is practiced. Although the invention has been described in the disclosed embodiments as specifically related to the melting of secondary aluminum, it will be apparent that the principles of the present invention are applicable to fuel-fired furnaces for melting other metals such as, for example, lead, copper, brass, and iron.

We claim:

1. A reverberatory furnace for melting aluminum scrap comprising a refractory lined furnace chamber having a lower portion adapted to contain a bath of molten aluminum, at least one charging door in said furnace chamber for admitting charge to said bath, air-fuel burner means mounted on said furnace and positioned so as to direct at least one air-fuel flame into the furnace chamber above the level of the molten bath of aluminum, flue means communicating with said chamber whereby off-gases can escape from said chamber, means to supply said air-fuel burner means with air and fuel for combustion, oxy-fuel burner means mounted on said furnace and positioned so as to direct an oxy-fuel flame into the furnace chamber above the level of the molten bath of aluminum along a path which intersects the combustion products of said air-fuel burner means, said oxy-fuel burner means having an inner end located substantially flush with the adjacent inner refractory lining whereby the burner means does not substantially extend into said furnace, means to supply said oxy-fuel burner means with oxygen and fuel in a ratio which is at least about 65 percent of the stoichiometric requirement for complete combustion and at a rate to produce an oxy-fuel flame having a flame velocity at least about eight times the flame velocity of said air-fuel burner means and having a maximum flame temperature at least about 30 percent greater than the latter, the combustion of said oxy-fuel flame being at least about 90 percent complete before the products of combustion contact the molten bath, whereby said oxy-fuel burner means introduces strong convection currents in the furnace to facilitate heat transfer to the said charge.

2. The combination in accordance with claim 1 wherein said fuel is gas and said oxy-fuel burner is an oxy-gas burner, wherein said oxy-fuel flame has a velocity of at least about 1000 feet per second and said flame has a maximum temperature of at least about 3000° F.

3. The combination in accordance with claim 1 wherein said fuel is oil and said oxy-fuel burner is an oxy-oil tip-mixer type burner comprising means for producing a stream of atomized oil at the nozzle of said burner and for imparting a substantial angular twist to said atomized stream to form a conical spray before said stream is emitted from said nozzle.

4. A combination in accordance with claim 1 comprising a plurality of charge doors spaced apart along the front of said furnace, wherein said oxy-fuel burner system comprises at least one burner disposed in a substantially normal direction through the roof of said furnace and directed along a vertical plane substantially bisecting the space between an adjacent pair of charge doors.

5. A combination in accordance with claim 1 in which said oxy-fuel burner system comprises a single oxy-gas burner directed along a vertical plane substantially bisecting one sidewall of said furnace, and directed downwardly at an acute angle with the horizontal from a position near the ceiling of said furnace.

6. A side hearth furnace in accordance with claim 1, for melting aluminum comprising a furnace proper, a scrap well communicating with the furnace proper, a sump communicating with the furnace proper, pump means to direct molten aluminum from the sump into the scrap well, said air-fuel burners and said at least one oxy-fuel burner positioned to direct their respective flames into the furnace proper.

7. The method of melting aluminum charge to a molten bath in a reverberatory furnace which comprises the steps of utilizing an air-fuel burner system to introduce and burn an air-fuel mixture in said furnace for supplying the major component of heat energy for melting said aluminum to a molten bath, utilizing an oxy-fuel burner system for supplying a supplemental minor component of heat energy for melting said aluminum charge by directing from a position flush with the inner furnace lining at least one turbulent oxy-fuel flame comprising post-mixed streams of oxygen and fuel into said furnace chamber above the level of the molten bath of aluminum along a path to interact with the combustion products of said air-fuel burner system, said at least one oxy-fuel flame having a flame velocity at least about eight times as great as the flame velocity of the said burning air-fuel mixture, said oxy-fuel mixture having at least about 65 percent of the stoichiometric amount of oxygen necessary for complete burning, and said at least one oxy-fuel flame being so directed that combustion is at least about 90 percent complete before the combustion products of said flame come in contact with said aluminum bath.

8. The method in accordance with claim 7 wherein said oxy-fuel burner system is turned off approximately as soon as said charge is melted.

9. The method in accordance with claim 7 wherein the temperature of the said at least one oxy-fuel flame exceeds the temperature of the burning air-fuel mixture by at least about 30 percent.

10. The method in accordance with claim 7 wherein said post-mixed streams of fuel and oxygen consist essentially of a centrally-disposed stream of atomized oil to which a substantial angular twist has been imparted causing said atomized oil stream to emerge in a conical configuration surrounded by a plurality of oxygen jets, producing a flame velocity within the range 500 to 1500 feet per second, and a maximum flame temperature within the range 3000° to 5000° F.

11. The method in accordance with claim 7 wherein said post-mixed streams of fuel and oxygen emerging from each burner of said oxy-fuel system consist essentially of a plurality of relatively larger jets of hydrocarbon gas surrounding and surrounded by a plurality of relatively smaller jets of oxygen, producing a flame velocity within the range 1000 to 3500 feet per second, and a maximum flame temperature within the range 3000° to 5000° F.

12. The method of melting aluminum in a reverberatory furnace in accordance with claim 7 in which the said charge is initially confined to several discrete piles, which comprises the steps of
utilizing an air-fuel burner system comprising a plurality of burners for supplying the major component of heat energy to said furnace, directing said air-fuel burners substantially into the area of said piles,
utilizing an oxy-fuel burner system comprising a plurality of burners for supplying a supplemental minor component of between 20 to 30 percent of the heat energy for melting said charge,
directing said oxy-fuel burners normally through the roof of said furnace and maintaining said burners at fixed positions spaced apart so that the flame from each of said oxy-fuel burners points between adjacent piles of said charge, said flames having a velocity exceeding about 1000 feet per second, at a maximum temperature between 3000° and 5000° F., substantially no contact being made between said flames and said piles of charge.

13. The method of melting aluminum in a reverberatory furnace in accordance with claim 7 in which said charge is essentially confined to several discrete piles, which comprises the steps of utilizing an air-fuel burner system comprising a plurality of burners for supplying the major component of heat energy to said furnace, directing the flames from said air-fuel burners substantially into the area of said piles, utilizing an oxy-fuel burner system comprising at least one oxy-fuel burner for supplying a supplemental minor component of the heat energy for melting said charge, directing said at least one oxy-fuel burner through the sidewall, so that said flame points downward at an acute angle with the horizontal, said flame making substantially no direct contact with said piles of charge.

14. The method of melting aluminum in a side-hearth reverberatory furnace in accordance with claim 7 in which said charge is initially confined to a separate scrap well and is melted by a stream of molten metal pumped into said scrap well from an adjacent sump, the improvement comprising the steps of: utilizing an air-fuel burner system comprising a plurality of air-fuel burners for supplying a major portion of the heat energy in said furnace, directing the flames from said air-fuel burners across said furnace directly above the molten bath in the principal chamber of said side-hearth furnace, utilizing an oxy-fuel burner system comprising at least one oxy-fuel burner for supplying a minor supplemental part of the heat energy required to melt said charge.

References Cited

UNITED STATES PATENTS

| | | | |
|---|---|---|---|
| 2,297,696 | 10/1942 | Elder | 263—43 |
| 2,534,825 | 12/1950 | Longenecker | 266—33 |
| 3,113,765 | 12/1963 | McGough | 266—33 |
| 3,115,405 | 12/1963 | Boyd | 266—33 |
| 3,303,019 | 2/1967 | Jacobs | 75—65 |
| 3,374,995 | 3/1968 | Cook | 263—40 |
| 3,446,494 | 5/1969 | Consogno | 266—33 |
| 2,671,724 | 3/1954 | Kompart | 75—65 |
| 3,029,141 | 4/1962 | Sibakin | 75—34 |
| 3,063,826 | 11/1962 | Cavanagh | 266—24 |
| 3,118,758 | 1/1964 | Ross | 75—26 |
| 3,141,763 | 7/1964 | Foresi | 75—60 |
| 3,197,539 | 7/1965 | Hinds | 13—9 |
| 3,459,867 | 8/1969 | Estes | 13—9 |
| 3,547,624 | 12/1970 | Gray | 75—43 |

CHARLES N. LOVELL, Primary Examiner

P. D. ROSENBERG, Assistant Examiner

U.S. Cl. X.R.

75—68; 266—33